(12) United States Patent
Elshafie et al.

(10) Patent No.: US 11,916,844 B2
(45) Date of Patent: Feb. 27, 2024

(54) CHANNEL STATE INFORMATION REPORTING FOR MULTIPLE PANEL USER EQUIPMENT

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/481,765

(22) Filed: Sep. 22, 2021

(65) Prior Publication Data

US 2023/0087391 A1    Mar. 23, 2023

(51) Int. Cl.
*H04W 24/10*    (2009.01)
*H04L 5/00*    (2006.01)

(52) U.S. Cl.
CPC ........... *H04L 5/0057* (2013.01); *H04W 24/10* (2013.01)

(58) Field of Classification Search
CPC .............................. H04L 5/0057; H04W 24/10
USPC ......................................................... 370/329
See application file for complete search history.

(56) References Cited

U.S. PATENT DOCUMENTS

| | | | |
|---|---|---|---|
| 2016/0261321 A1* | 9/2016 | Andgart | H04L 1/0003 |
| 2020/0267582 A1* | 8/2020 | Chen | H04B 7/063 |
| 2021/0143879 A1* | 5/2021 | Ji | H04B 17/327 |

FOREIGN PATENT DOCUMENTS

WO    WO-2017080132 A1    5/2017

OTHER PUBLICATIONS

International Search Report and Written Opinion—PCT/US2022/041008—ISA/EPO—dated Nov. 22, 2022.
NTT Docomo et al., "Enhancements on Multi-TRP/Panel Transmission", 3GPP TSG RAN WG1 #96bis, R1-1904966, 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019 Mar. 29, 2019, XP051691893, section 2.1.4, 29 Pages, p. 4-p. 6.

* cited by examiner

*Primary Examiner* — Christopher R Crompton
(74) *Attorney, Agent, or Firm* — Holland & Hart LLP /Qualcomm Incorporated

(57) ABSTRACT

Methods, systems, and devices for wireless communications are described. A user equipment (UE) may receive, from a base station, a downlink message via multiple receive antennas including a first group of receive antennas associated with a first antenna panel and a second group of receive antennas associated with a second antenna panel. The UE may generate two or more CSI reports based on receiving the downlink message, where each CSI report is associated with at least one of the first antenna panel or the second antenna panel. The UE may select at least one of the two or more CSI reports to transmit to the base station. In some examples, the UE may receive (e.g., via control signaling) a CSI report configuration and may select the at least one CSI report for transmission based on the CSI report configuration.

28 Claims, 16 Drawing Sheets

CHANNEL STATE INFORMATION REPORTING FOR MULTIPLE PANEL USER EQUIPMENT

FIELD OF TECHNOLOGY

The following relates to wireless communications, including channel state information (CSI) reporting for multiple panel user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a device may transmit or receive the signals using multiple antennas or combinations of antennas arranged on one or more antenna panels. An antenna panel utilized for receiving signals may include multiple receive antennas as well as other radio frequency (RF) components, such as demodulators, decoders, and the like. Increasing a quantity of receive antennas at a device may increase performance and throughput at the device as the device may support receiving an increased quantity of layers. However, increasing the quantity of receive antennas may correspond to a relatively higher complexity in the RF component architecture, which may increase processing and power consumption at the device.

SUMMARY

The described techniques relate to improved methods, systems, devices, and apparatuses that support channel state information (CSI) reporting for multiple panel user equipment (UE). Generally, the described techniques provide for a UE having multiple antenna panels, each including multiple receive antennas, to generate and transmit multiple CSI reports based on receiving a single downlink transmission via the multiple receive antennas. The UE may generate a CSI report for each individual antenna panel and for a combination of antenna panels. For instance, the UE may determine a first CSI associated with reception of the downlink transmission at a first antenna panel and a second CSI associated with reception of the downlink transmission at a second antenna panel. The first CSI and the second CSI may be based on measuring reference signals, such as demodulation reference signals (DMRSs), received at the respective antenna panels. Additionally, the UE may determine a third CSI associated with the combination of the first antenna panel and the second antenna panel, for instance, by combining channel impulse responses associated with the respective antenna panels (e.g., based on DMRSs received at the respective antenna panels) or by combining log-likelihood ratios (LLRs) associated with the respective antenna panels.

The UE may generate CSI reports corresponding to the first antenna panel, the second antenna panel, and the combination of the first and second antenna panels based on the respective CSI. The UE may transmit at least one of the CSI reports to a base station. In some cases, the UE may select the at least one CSI report (e.g., and any additional CSI reports) to transmit to the base station based on a CSI report configuration, which may be indicated (e.g., via control signaling) to the UE by the base station. The CSI report configuration may indicate which, if any, CSI reports that the UE is to transmit to the base station. For example, the CSI report configuration may include one or more bitmaps, where each bit of a bitmap corresponds to a CSI report and the value of a bit indicates whether the UE is to transmit the CSI report. The CSI report configuration may additionally or alternatively indicate information to be included in each respective CSI report, such as a modulation and coding scheme (MSC), a channel quality indicator (CQI), a channel rank, or the like. In some cases, the UE may transmit the CSI report(s) in uplink control information (UCI), such as in a second stage of a two-stage UCI.

A method for wireless communications at a UE is described. The method may include receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE, generating a set of two or more CSI reports based on receiving the downlink message via the set of multiple receive antennas, each of the set of two or more CSI reports associated with at least one of the first antenna panel or the second antenna panel, and transmitting, to the base station, an UCI message that includes at least one of the set of two or more CSI reports.

An apparatus for wireless communications at a UE is described. The apparatus may include a processor, memory coupled with the processor, and instructions stored in the memory. The instructions may be executable by the processor to cause the apparatus to receive, from a base station, a downlink message via a set of multiple receive antennas of the UE, the set of multiple receive antennas including a first group of receive antennas associated with a first antenna panel of the UE and a second group of receive antennas associated with a second antenna panel of the UE, generate a set of two or more CSI reports based on receiving the downlink message via the set of multiple receive antennas, each of the set of two or more CSI reports associated with at least one of the first antenna panel or the second antenna panel, and transmit, to the base station, an UCI message that includes at least one of the set of two or more CSI reports.

Another apparatus for wireless communications at a UE is described. The apparatus may include means for receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE, means for generating a set of two or more CSI reports based on receiving the downlink message via the set of multiple receive antennas, each of the set of two or more CSI reports associated with at least one of the first antenna panel or the second antenna panel, and means for transmitting, to the base station, an UCI message that includes at least one of the set of two or more CSI reports.

A non-transitory computer-readable medium storing code for wireless communications at a UE is described. The code may include instructions executable by a processor to receive, from a base station, a downlink message via a set of multiple receive antennas of the UE, the set of multiple receive antennas including a first group of receive antennas associated with a first antenna panel of the UE and a second group of receive antennas associated with a second antenna panel of the UE, generate a set of two or more CSI reports based on receiving the downlink message via the set of multiple receive antennas, each of the set of two or more CSI reports associated with at least one of the first antenna panel or the second antenna panel, and transmit, to the base station, an UCI message that includes at least one of the set of two or more CSI reports.

In some examples of the method, apparatuses, and non-transitory computer-readable medium described herein, generating the set of two or more CSI reports may include operations, features, means, or instructions for generating at least a first CSI report associated with the first antenna panel and a second CSI report associated with the second antenna panel.

In some examples of the method, apparatuses, and non-transitory computer-readable medium described herein, generating at least the first CSI report and the second CSI report may include operations, features, means, or instructions for generating the first CSI report based on a DMRS measurement at the first antenna panel and generating the second CSI report based on a DMRS measurement at the second antenna panel.

In some examples of the method, apparatuses, and non-transitory computer-readable medium described herein, generating the set of two or more CSI reports may include operations, features, means, or instructions for generating a third CSI report associated with both the first antenna panel and the second antenna panel based on combining a first channel impulse associated with the first antenna panel and a second channel impulse associated with the second antenna panel, or combining a first LLR associated with the first antenna panel and a second LLR associated with the second antenna panel.

Some examples of the method, apparatuses, and non-transitory computer-readable medium described herein may further include operations, features, means, or instructions for receiving control signaling indicating a CSI report configuration that indicates the at least one of the set of two or more CSI reports to be transmitted and selecting the at least one of the set of two or more CSI reports based on the CSI report configuration.

In some examples of the method, apparatuses, and non-transitory computer-readable medium described herein, selecting the at least one of the set of two or more CSI reports may include operations, features, means, or instructions for selecting the at least one of the set of two or more CSI reports based on one or more bitmaps indicated by the CSI report configuration, each bit of the one or more bitmaps indicating whether a different CSI report of the set of two or more CSI reports may be to be transmitted.

Some examples of the method, apparatuses, and non-transitory computer-readable medium described herein may further include operations, features, means, or instructions for determining an acknowledgment level associated with receipt of the downlink message, each acknowledgment level based on either how close a successful decoding of the downlink message was to being an unsuccessful decoding, or how close an unsuccessful decoding of the downlink message was to being a successful decoding, where each bitmap of the one or more bitmaps corresponds to a different acknowledgement level.

In some examples of the method, apparatuses, and non-transitory computer-readable medium described herein, determining the acknowledgment level may include operations, features, means, or instructions for measuring an SINR of the downlink message, mapping the SINR to a first modulation and coding scheme value, and selecting the acknowledgment level from a set of multiple acknowledgment levels based on a difference between the first modulation and coding scheme value and a scheduled modulation and coding scheme value for the downlink message.

In some examples of the method, apparatuses, and non-transitory computer-readable medium described herein, determining the acknowledgment level may include operations, features, means, or instructions for measuring a first SINR of the downlink message, identifying a scheduled modulation and coding scheme value for the downlink message, mapping the scheduled modulation and coding scheme value to a nominal SINR, and selecting the acknowledgment level from a set of multiple acknowledgment levels based on a difference between the first SINR and the nominal SINR.

In some examples of the method, apparatuses, and non-transitory computer-readable medium described herein, transmitting the UCI message may include operations, features, means, or instructions for transmitting, in the UCI message, an indication of the acknowledgement level associated with the downlink message.

In some examples of the method, apparatuses, and non-transitory computer-readable medium described herein, receiving the control signaling indicating the CSI report configuration may include operations, features, means, or instructions for receiving an indication in the CSI report configuration that the at least one of the set of two or more CSI reports that may be to be selected for transmission may be based on whether individual ones of the set of two or more CSI reports may be associated with a sounded panel of the first antenna panel or the second antenna panel, an unsounded panel of the first antenna panel or the second antenna panel, or a combination of the first antenna panel and the second antenna panel.

In some examples of the method, apparatuses, and non-transitory computer-readable medium described herein, receiving the control signaling indicating the CSI report configuration may include operations, features, means, or instructions for receiving an indication in the CSI report configuration that the at least one of the set of two or more CSI reports that may be to be selected for transmission includes a CQI, an MCS, a channel rank, a minimum channel rank, or a combination thereof.

In some examples of the method, apparatuses, and non-transitory computer-readable medium described herein, receiving the control signaling indicating the CSI report configuration may include operations, features, means, or instructions for receiving an indication in the CSI report configuration that the at least one of the set of two or more CSI reports that may be to be selected for transmission may be based on whether a negative acknowledgement may be associated with reception of the downlink message.

Some examples of the method, apparatuses, and non-transitory computer-readable medium described herein may further include operations, features, means, or instructions for generating the UCI message as a two-stage UCI message, where a first stage of the two-stage UCI message includes acknowledgment or negative acknowledgment information pertaining to reception of the downlink message, and where a second stage of the two-stage UCI message includes the at least one of the set of two or more CSI reports.

In some examples of the method, apparatuses, and non-transitory computer-readable medium described herein, the second stage of the two-stage UCI message may be formatted to include any one or more of a first CSI report, a second CSI report, or a third CSI report.

Some examples of the method, apparatuses, and non-transitory computer-readable medium described herein may further include operations, features, means, or instructions for determining a respective quantity of bits to carry CSI in each of the set of two or more CSI reports.

In some examples of the method, apparatuses, and non-transitory computer-readable medium described herein, each quantity of bits may be based on a sounding status of the first antenna panel and the second antenna panel.

In some examples of the method, apparatuses, and non-transitory computer-readable medium described herein, each quantity of bits may be based on whether the CSI carried in each report may be to include a wideband MCS, a wideband rank indicator (RI), a wideband CQI, a subband MCS, a subband RI, a subband CQI, or combinations thereof.

In some examples of the method, apparatuses, and non-transitory computer-readable medium described herein, determining the respective quantity of bits may include operations, features, means, or instructions for receiving an indication of each quantity of bits via radio resource control (RRC) signaling.

A method for wireless communications at a base station is described. The method may include transmitting a downlink message to a UE that includes a set of multiple receive antennas that include a first group of receive antennas associated with a first antenna panel of the UE and a second group of receive antennas associated with a second antenna panel of the UE and receiving, from the UE, an UCI message that includes at least one CSI report based on the downlink message, the at least one CSI report associated with either the first antenna panel of the UE, the second antenna panel of the UE, or both the first antenna panel and the second antenna panel.

An apparatus for wireless communications at a base station is described. The apparatus may include a processor, memory coupled with the processor, and instructions stored in the memory. The instructions may be executable by the processor to cause the apparatus to transmit a downlink message to a UE that includes a set of multiple receive antennas that include a first group of receive antennas associated with a first antenna panel of the UE and a second group of receive antennas associated with a second antenna panel of the UE and receive, from the UE, an UCI message that includes at least one CSI report based on the downlink message, the at least one CSI report associated with either the first antenna panel of the UE, the second antenna panel of the UE, or both the first antenna panel and the second antenna panel.

Another apparatus for wireless communications at a base station is described. The apparatus may include means for transmitting a downlink message to a UE that includes a set of multiple receive antennas that include a first group of receive antennas associated with a first antenna panel of the UE and a second group of receive antennas associated with a second antenna panel of the UE and means for receiving, from the UE, an UCI message that includes at least one CSI report based on the downlink message, the at least one CSI report associated with either the first antenna panel of the UE, the second antenna panel of the UE, or both the first antenna panel and the second antenna panel.

A non-transitory computer-readable medium storing code for wireless communications at a base station is described. The code may include instructions executable by a processor to transmit a downlink message to a UE that includes a set of multiple receive antennas that include a first group of receive antennas associated with a first antenna panel of the UE and a second group of receive antennas associated with a second antenna panel of the UE and receive, from the UE, an UCI message that includes at least one CSI report based on the downlink message, the at least one CSI report associated with either the first antenna panel of the UE, the second antenna panel of the UE, or both the first antenna panel and the second antenna panel.

In some examples of the method, apparatuses, and non-transitory computer-readable medium described herein, receiving the at least one CSI report may include operations, features, means, or instructions for receiving at least a first CSI report associated with the first antenna panel of the UE and a second CSI report associated with the second antenna panel of the UE.

In some examples of the method, apparatuses, and non-transitory computer-readable medium described herein, receiving the at least one CSI report may include operations, features, means, or instructions for receiving a third CSI report associated with both the first antenna panel of the UE and the second antenna panel of the UE.

Some examples of the method, apparatuses, and non-transitory computer-readable medium described herein may further include operations, features, means, or instructions for transmitting control signaling indicating a CSI report configuration that indicates the at least one CSI report and receiving the at least one CSI report based on the CSI report configuration.

In some examples of the method, apparatuses, and non-transitory computer-readable medium described herein, transmitting control signaling indicating the CSI report configuration may include operations, features, means, or instructions for transmitting, as part of the CSI report configuration, an indication of one or more bitmaps, each bit of the one or more bitmaps indicating whether a different CSI report may be to be transmitted.

In some examples of the method, apparatuses, and non-transitory computer-readable medium described herein, transmitting control signaling indicating the CSI report configuration may include operations, features, means, or instructions for transmitting, as part of the CSI report configuration, an indication that the at least one CSI report includes a CQI, an MCS, a channel rank, a minimum channel rank, or a combination thereof.

Some examples of the method, apparatuses, and non-transitory computer-readable medium described herein may further include operations, features, means, or instructions for receiving the UCI message as a two-stage UCI message, where a first stage of the two-stage UCI message includes acknowledgment or negative acknowledgment information pertaining to reception of the downlink message, and where a second stage of the two-stage UCI message includes the at least one CSI report.

In some examples of the method, apparatuses, and non-transitory computer-readable medium described herein, the second stage of the two-stage UCI message may be formatted to include any one or more of a first CSI report, a second CSI report, or a third CSI report.

Some examples of the method, apparatuses, and non-transitory computer-readable medium described herein may further include operations, features, means, or instructions for transmitting, via radio resource control signaling, an indication of a respective quantity of bits to carry CSI included in the at least one CSI report.

DETAILED DESCRIPTION

Figure 1:
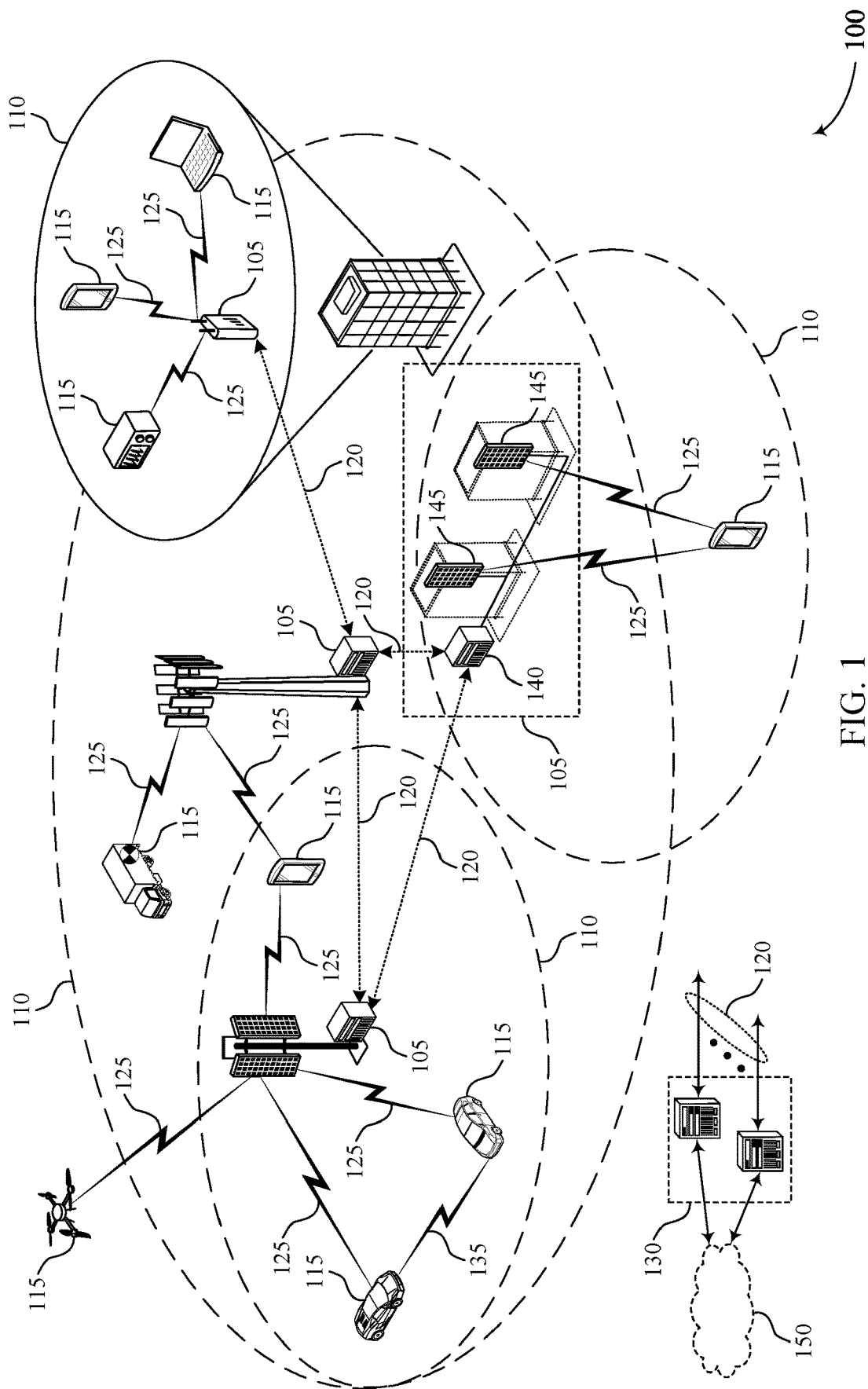
FIG. 1 illustrates an example of a wireless communications system that supports channel state information (CSI) reporting for multiple panel user equipment (UE) in accordance with aspects of the present disclosure.

In some wireless communications systems, devices (e.g., user equipment (UE), base stations) may support multiple input multiple output (MIMO) communications, in which a device transmits and receives multiple signals using different spatial layers. In some cases, the device may transmit and receive the multiple signals using multiple antennas or combinations of antennas. For instance, a user equipment (UE) may have multiple antenna panels, where each antenna panel includes multiple antenna elements. In such cases, each antenna element may be associated with one or more radio frequency (RF) components. A given antenna panel may include, for example, a group of receive antennas and may be associated with a demodulator and a decoder; a signal may be received by the receive antennas and processed via the demodulator and decoder. The use of a relatively large number of antenna elements (and corresponding RF components), however, may be associated with considerable power consumption and increased complexity in RF architecture. Accordingly, conventional procedures and techniques may not be capable of supporting increasingly higher numbers of antenna elements and/or antenna panels.

The techniques described herein support channel state information (CSI) reporting procedures for a UE having multiple antenna panels, each antenna panel including a respective group of antenna elements. For example, a first antenna panel may include a first group of receive antennas and a second antenna panel may include a second group of receive antennas. The UE may receive (e.g., from a base station) a downlink message, such as a physical downlink shared channel (PDSCH) transmission, via the receive antennas of both antenna panels. In some examples, the downlink message may be associated with a reference signal, such as a demodulation reference signal (DMRS), received at the corresponding antenna panel. The UE may determine CSI for each antenna panel, for instance, based on the associated DMRS of the downlink transmission, and may generate a set of CSI reports (e.g., two or more CSI reports) based on the CSI. For example, the UE may generate a first CSI report associated with the first antenna panel and a second CSI report associated with the second antenna panel. In some cases, the UE may generate a third CSI report that is associated with both the first antenna panel and the second antenna panel, e.g., based on combining information (such as channel impulse responses (CIRs) or log-likelihood ratios (LLRs)) associated with both antenna panels.

The UE may select at least one of the set of CSI reports to transmit to the base station, for example, as part of uplink control information (UCI). The UCI may be a two-stage UCI such that the UE transmits acknowledgment information related to the downlink message in a first stage of the UCI and transmits the at least one CSI report in a second stage of the UCI. In some examples, the UE may select the CSI report(s) to transmit to the base station based on control signaling (e.g., radio resource control (RRC) signaling, a media access control (MAC) control element (MAC-CE), downlink control information (DCI)) indicated (e.g., by the base station) to the UE, such as a CSI report configuration. The control signaling may indicate which CSI reports the UE is to transmit. For instance, the control signaling may indicate that the UE is to transmit a CSI report associated with a given antenna panel, or that the UE is to transmit a CSI report based on whether a negative acknowledgment (NACK) is associated with receipt of the downlink message, or that the UE is to transmit a CSI report for any antenna panel that is unsounded, among other examples.

Particular aspects of the subject matter described herein may be implemented to realize one or more advantages. The described techniques may support relatively higher quantities of antenna elements at a UE. For example, by implementing CSI reporting procedures per antenna panel, a UE may include a greater number of antenna elements without adversely affecting processing or power consumption. In another example, reporting CSI for individual antenna panels and combinations of antenna panels may provide the base station with additional information. Here, the base station may improve communications efficiency and reliability, for instance, by selecting or modifying communications parameters based on the reported CSI.

Additionally, the described techniques support improvements in CSI procedures performed at the UE. For instance, the UE may generate CSI reports with increased granularity. More specifically, the UE may generate CSI reports for respective antenna panels and combinations of antenna panels, which may relatively increase the accuracy and efficacy of the CSI reports. Thus, the supported techniques may include improved UE operations, and, in some examples, may promote efficiencies in communications, among other benefits.

Aspects of the disclosure are initially described in the context of wireless communications systems. Aspects of the disclosure are then illustrated by device architectures and a process flow. Aspects of the disclosure are further illustrated by and described with reference to apparatus diagrams, system diagrams, and flowcharts that relate to CSI reporting for multiple panel UEs.

FIG. 1 illustrates an example of a wireless communications system 100 that supports CSI reporting for multiple panel user equipment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, devices (e.g., user equipment (UE), base stations) may support multiple input multiple output (MIMO) communications, in which a device transmits and receives multiple signals using different spatial layers. In some cases, the device may transmit and receive the multiple signals using multiple antennas or combinations of antennas. For instance, a user equipment (UE) may have multiple antenna panels, where each antenna panel includes multiple antenna elements. In such cases, each antenna element may be associated with one or more radio frequency (RF) components. A given antenna panel may include, for example, a group of receive antennas and may be associated with a demodulator and a decoder; a signal may be received by the receive antennas and processed via the demodulator and decoder. The use of a relatively large number of antenna elements (and corresponding RF components), however, may be associated with considerable power consumption and increased complexity in RF architecture. Accordingly, conventional procedures and techniques may not be capable of supporting increasingly higher numbers of antenna elements and/or antenna panels.

A UE 115 and a base station 105 may communicate over a communication link 125. In some implementations, the UE 115 may perform one or more channel measurements of the communication link 125 between the UE 115 and the base station 105 to determine a channel quality associated with the communication link 125. For instance, the base station 105 may transmit one or more reference signals (e.g., CSI-RS, DMRS) to the UE 115 for the UE 115 to determine a channel estimate that is used to assist in link adaptation. Additionally, or alternatively, the UE 115 may perform one or more channel measurements (e.g., CSI measurements) based on the one or more received reference signals and may transmit a CSI report to the base station 105. Based on the CSI report, the UE 115, the base station 105, or both, may adapt transmission parameters to maintain a reliable communication link between the UE 115 and the base station 105.

In some examples, the CSI report may include one or more parameters based on the CSI measurements. For instance, the CSI report may include one or more precoding matrix indicators (PMIs), rank indicators (RIs), layer indicators (LIs), channel quality indicators (CQIs), reference signal received power (RSRP) measurements (e.g., Layer 1-RSRPs (L1-RSRPs)), signal to interference plus noise (SINR) measurements (e.g., L1-SINRs), or the like. In some examples, the UE 115 may perform periodic CSI reporting (e.g., the base station 105 may transmit higher layer signaling scheduling periodic CSI reports), aperiodic CSI reporting (e.g., the base station 105 may dynamically configure a CSI report), semi-persistent CSI reporting (e.g., the base station 105 may transmit higher layer signaling scheduling periodic CSI reports and may use dynamic signaling to trigger the periodic CSI reporting), or a combination thereof.

In some examples of the wireless communications system 100, the base station 105, the UE 115, or both, may be configured with multiple antennas, which may be used to employ techniques such as transmit diversity, receive diversity, MIMO communications, or beamforming, or any combination thereof. For example, in MIMO operations, a device may transmit and receive multiple signals using different spatial layers based on one or more antenna ports of an antenna panel. As another example, multiple antennas may enable full duplex communications, where a device may transmit and receive simultaneously (e.g., in a same time frame); in sub-band full duplex communications, for instance, both uplink and downlink transmissions may share a same time resource (e.g., and different frequency resources). MIMO and full duplex communications may increase throughput and reduce latency in the wireless communications system 100.

The antennas of the base station 105 and the UE 115 may be located within one or more antenna arrays or antenna panels arranged in an antenna configuration. For example, an antenna configuration may include a quantity of antenna panels. Each antenna panel may include a number of antenna elements arranged in a configuration. An antenna panel may support radio frequency beamforming for a signal transmitted via one or more antenna ports. The base station 105 and the UE 115 may thus be configured to support beamformed communications using multiple antenna ports. The quantity of antenna ports supported by an antenna panel may be based on the quantity and configuration of antenna elements, and the total quantity of antenna ports for an antenna configuration may further depend on the total number of antenna panels.

Base stations 105 and UEs 115 in the wireless communications system 100 may have any number of antenna elements and antenna panels. For example, massive MIMO operations may be supported by relatively large numbers of antenna panels. At a UE 115, an increased number of receive antenna elements may enable the UE 115 to support receiving relatively higher quantities of layers (i.e., spatial layers). In a specific example, a UE 115 with eight receive antennas may support eight downlink layers, where each receive antenna receives a single layer (e.g., of a same downlink transmission). Additionally, the UE 115 may combine signal information from the multiple antennas to increase diversity and improve performance. However, as the number of antenna elements and corresponding RF components increases, power consumption also increases; additionally, a greater number of layers may be associated with more complex architecture in order to decouple and decode the layers, which in turn may increase baseband processing.

In some cases, a base station 105 and a UE 115 may perform channel sounding as part of channel estimation. The UE 115 may transmit a sounding reference signal (SRS) to the base station 105, and the base station 105 may measure the SRS and estimate the quality of the associated channel. A UE 115 that has multiple antenna panels may perform sounding for each antenna panel by transmitting an SRS from respective antenna panels; an antenna panel from which the UE 115 has transmitted an SRS may be referred to as a sounded antenna panel, while an antenna panel from which the UE 115 has not transmitted an SRS may be referred to as an unsounded antenna panel. The base station 105 may utilize information provided by the SRSs in beamforming and resource allocation for subsequent downlink transmissions. However, in some examples, downlink beamforming at the base station 105 may be based on channels sounded from all possible antenna elements (e.g., all antenna panels). Accordingly, mismatch between a precoding scheme at the base station 105 and processing at receive antennas of the UE 115 may occur; e.g., each demodulator at the UE 115 may be linked to a respective subset of receive antennas, while the downlink beamforming may be based on all antenna elements. Such mismatch may degrade performance. For instance, the downlink beamforming may be determined assuming that a demodulator at the UE 115 receives signal energy from all antenna elements, rather than only from the corresponding subset of antenna elements. In another example, the base station 105 may beamform a majority of signal energy toward a first subset of receive antennas such that other demodulators not associated with the first subset of receive antennas may not sufficiently receive the signal. Without sufficient signal energy, a demodulator may not properly perform demodulation, and the receive diversity may decrease.

To alleviate such performance degradation, a UE 115 may indicate a demodulator mode to the base station 105 such that the base station 105 considers the demodulator mode when performing downlink beamforming and precoding. As explained in greater detail with reference to FIG. 3, the UE 115 may support different demodulator modes, where each demodulator mode corresponds to a component architecture at the UE 115. Varying component architectures may be associated with varying levels of architectural complexity, where component architectures with relatively higher numbers of antenna elements and corresponding RF components may be associated with relatively higher complexity. For example, in a first demodulator mode (e.g., demodulator mode 1), the UE 115 may include more than four receive antennas and each antenna may receive a layer; the receive antennas may be associated with a same demodulator. In a second demodulator mode (e.g., demodulator mode 2), the UE 115 may group the receive antennas into one or more subsets such that each subset of antennas receives and decodes a quantity (e.g., four or less) of layers; each subset of antennas may be associated with respective demodulators. In the second demodulator mode, the UE 115 may combine outputs of the respective demodulators. A third demodulator mode (e.g., demodulator mode 3) may be substantially similar to the second demodulator mode, in that each subset of antennas receives a quantity of layers, but the UE 115 may not combine outputs in the third demodulator mode.

In some cases, a UE 115 with multiple antenna panels may demodulate a signal on a per-panel basis by selecting one antenna panel at a given time. In such examples, the UE 115 may store samples (e.g., I/Q samples) from each antenna panel. The UE 115 may decode the signal based on the selected antenna panel. Additionally, the UE 115 may determine CSI using the stored samples as well as DMRS measurements associated with the non-selected antenna panel.

As the complexity increases with an increased number of antenna elements and layers, procedures and techniques utilized for relatively lower-complexity architecture may not be applicable for a device that supports a relatively higher complexity architecture. For example, some procedures may be based on four receive antennas and may not be utilized at a device having greater than four receive antennas. Accordingly, techniques described herein support CSI reporting procedures at a device, such as a UE 115, with multiple antenna panels each including multiple receive antennas. The UE 115 may generate and transmit multiple CSI reports for a single downlink transmission (e.g., a PDSCH transmission) based on the multiple antenna panels. For instance, the UE 115 may support a second demodulator mode or a third demodulator mode such that a first antenna panel of the UE 115 includes a first group of receive antennas and a second antenna panel of the UE 115 includes a second group of receive antennas. The UE 115 may receive the downlink transmission via the multiple receive antennas and may generate a set of CSI reports (e.g., two or more CSI reports) based on the receiving the downlink transmission via the multiple antennas. For example, the UE may generate a first CSI report associated with the first antenna panel and a second CSI report associated with the second antenna panel. In some cases, the UE 115 may generate a third CSI report that is associated with both the first antenna panel and the second antenna panel, e.g., based on combining information (such as channel impulse responses (CIRs) or log-likelihood ratios (LLRs)) associated with both antenna panels.

The UE 115 may select at least one of the set of CSI reports to transmit to the base station. In some cases, the UE 115 may transmit the at least one CSI report as part of UCI, e.g., via a physical uplink control channel (PUCCH) or a physical uplink shared channel (PUSCH). A UCI message may generally include HARQ feedback, CSI, and scheduling requests, among other examples. The UCI may be a two-stage UCI such that the UE 115 transmits HARQ feedback (e.g., acknowledgement information, such as an acknowledgment (ACK) or negative acknowledgment (NACK)) related to the downlink message in a first stage of the UCI and transmits the at least one CSI report in a second stage of the UCI. In some examples, the UE 115 may select the CSI report(s) to transmit to the base station based on control signaling (e.g., RRC signaling, MAC-CE, DCI) indicated (e.g., by the base station) to the UE, such as a CSI report configuration. The control signaling may indicate which CSI reports the UE 115 is to transmit. For instance, the control signaling may indicate that the UE 115 is to transmit a CSI report associated with a given antenna panel, or for any antenna panel that is unsounded, among other examples.

Figure 2:
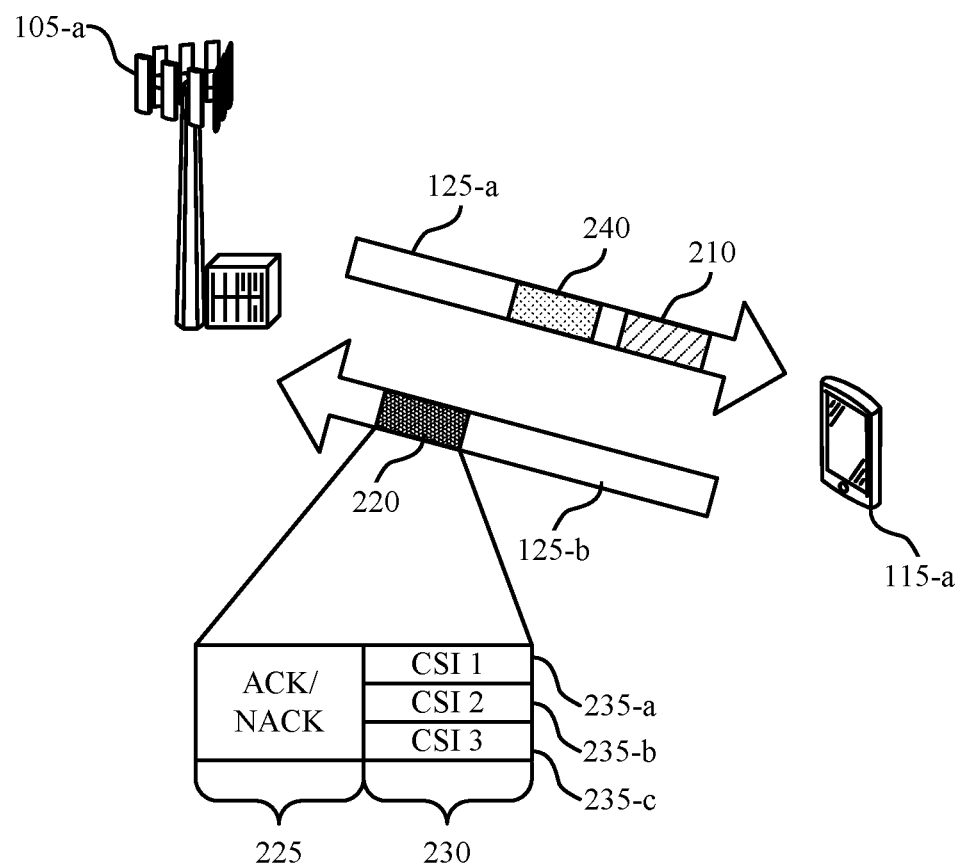
FIG. 2 illustrates an example of a wireless communications system that supports CSI reporting for multiple panel UEs in accordance with aspects of the present disclosure.

FIG. 2 illustrates an example of a wireless communications system 200 that supports CSI reporting for multiple panel UEs in accordance with aspects of the present disclosure. In some examples, wireless communications system 200 may implement aspects of wireless communications system 100. For instance, wireless communications system 200 includes a UE 115-a and a base station 105-a, which may be examples of the corresponding devices described with reference to FIG. 1. Although aspects of the present disclosure are described with reference to a UE 115 and base station 105, it is understood that the described techniques may be performed by a wireless device different from a UE 115 and base station 105. Stated another way, operations performed by the UE 115-a and the base station 105-a may be respectively performed by a UE 115, a base station 105, or another wireless device, and the example shown should not be construed as limiting.

The UE 115-a may communicate with the base station 105-a via communication links 125-a and 125-b, which may be examples of a downlink and an uplink, respectively. The base station 105-a and the UE 115-a may be configured with multiple antennas located within antenna panels. As a non-limiting example, the UE 115-a may include a first group of antennas associated with a first antenna panel and a second group of antennas associated with a second antenna panel; each antenna panel of the UE 115-a may be associated with a demodulator. The UE 115-a may transmit and receive downlink and uplink transmissions using the antenna panels. Additionally, in MIMO communications, the multiple antennas may support transmission and reception of different data streams. As an example, the UE 115-a may transmit and receive multiple signals using different spatial layers. In some cases, each data stream may be referred to as a MIMO layer, where the number of MIMO layers for MIMO communications may be based on the number of transmit and receive antennas.

In the wireless communications system 200, the UE 115-a and the base station 105-a may each perform channel and interference measurements to maintain or improve the communication links 125. For instance, the UE 115-a may transmit an SRS to the base station 105-a via an uplink channel of the communication link 125-b, and the base station 105-a may measure the SRS to estimate conditions of the channel. Based on channel reciprocity, the base station 105-a may select or modify communications parameters for subsequent transmissions to the UE 115-a via a downlink channel of the communication link 125-a. Additionally, or alternatively, the UE 115-a may receive a reference signal from the base station 105-a and may determine CSI based on measurements associated with the reference signal. The UE 115-a may generate a report (i.e., a CSI report) based on the determined CSI and may transmit the CSI report to the base station 105-a. In some examples, the CSI report may include indications of channel parameters requested by the UE 115-a based on the reference signal measurements.

In the example of FIG. 2, the base station 105-a may transmit a downlink message 210 via the communication link 125-a. The UE 115-a may receive the downlink message 210 via the multiple antennas (e.g., receive antennas) of the UE 115-a. That is, the UE 115-a may receive the downlink message 210 via the first group of receive antennas associated with the first antenna panel and the second group of receive antennas associated with the second antenna panel. Based on receiving the downlink message, the UE 115-a may determine HARQ feedback (e.g., ACK or NACK) and CSI. The UE 115-a may transmit an indication of the HARQ feedback and a CSI report indicating the CSI to the base station 105-a as part of a UCI message 220, which may allow the base station 105-a to perform link adaptation procedures and optimize communications parameters for the communication link 125-a.

According to the techniques described herein, the UE 115-a may generate multiple CSI reports 235 (e.g., two or more CSI reports) based on receiving the downlink message 210 via the multiple antennas. For instance, the UE 115-a may generate a set of two or more CSI reports 235 based on CSI associated with each respective antenna panel, such as a first CSI report (e.g., CSI report 235-a) associated with the first antenna panel and a second CSI report (e.g., CSI report 235-b) associated with the second antenna panel. In some examples, the UE 115-a may generate a CSI report 235 based on a combination of antenna panels (e.g., a third CSI report, such as CSI report 235-c, associated with both the first antenna panel and the second antenna panel). While aspects of the present disclosure are described with reference to a UE 115-a having two antenna panels, it is to be understood that the described techniques may be applied to any device having any number of antennas and antenna panels. For example, the UE 115-a may generate a quantity of CSI reports 235 equal to a quantity of antenna panels at the UE 115-a, and any additional CSI reports 235 for any additional combination of two or more antenna panels.

The UE 115-a may transmit at least one of the generated CSI reports 235 to the base station 105-a, for instance, as part of the UCI message 220, which may also include HARQ feedback. In some examples, the UE 115-a may generate the UCI message 220 as a two-stage UCI message 220 including a first stage 225 and a second stage 230. In such examples, the first stage 225 may include HARQ feedback, such as an ACK or a NACK, pertaining to receipt of the downlink message 210. That is, the UE 115-a may include an ACK in the first stage 225 if the downlink message 210 was successfully received and decoded; otherwise, the UE 115-*a* may include a NACK in the first stage 225. The UE 115-*a* may include the at least one CSI report 235 in the second stage 230. In the example of FIG. 2, the UE 115-*a* may include, in the second stage 230, the first CSI report 235-*a*, the second CSI report 235-*b*, and the third CSI report 235-*c*.

In some examples, the UE 115-*a* may generate each CSI report 235 based on DMRS measurements associated with the respective antenna panel. The first CSI report 235-*a* may be generated based on a DMRS measurement at the first antenna panel, the second CSI report 235-*b* may be generated based on a DMRS measurement at the second antenna panel, and so on. Additionally, or alternatively, the UE 115-*a* may generate each CSI report 235 based on respective LLRs associated with each antenna panel. A CSI report 235 for a combination of antenna panels (e.g., the third CSI report 235-*c* associated with both the first antenna panel and the second antenna panel) may be generated based on a combination of DMRS or LLR information related to the combined antenna panels. For instance, the UE 115-*a* may generate the third CSI report 235-*c* by combining a channel impulse response associated with the first antenna panel and a channel impulse response associated with the second antenna panel, where each channel impulse response is based on the DMRS measurement at the respective antenna panel. Additionally, or alternatively, the UE 115-*a* may generate the third CSI report 235-*c* by combining an LLR associated with the first antenna panel and an LLR associated with the second antenna panel.

The UE 115-*a* may select all or a subset of the generated CSI reports 235 to transmit to the base station 105-*a*. In some examples, the UE 115-*a* may select one or more CSI reports 235 to transmit based on receiving control signaling from the base station 105-*a*. For example, the base station 105-*a* may transmit control signaling (e.g., RRC signaling, MAC-CE, DCI) including a CSI report configuration 240; the CSI report configuration 240 may include one or more indications of the one or more CSI reports 235 to be transmitted or criteria to be met for transmitting the one or more CSI reports 235. The base station 105-*a* may initially configure the UE 115-*a* with the CSI report configuration 240 via RRC signaling or MAC-CE, and may additionally or alternatively dynamically update the CSI report configuration 240 via DCI.

In some cases, the CSI report configuration 240 may include an indication that the UE 115-*a* is to select a CSI report 235 (e.g., at least one CSI report 235) for transmission based on whether a NACK is associated with receipt of the downlink message 210; the indication may be represented by one bit. That is, a value of the bit (e.g., 0 or 1) may indicate that the UE 115-*a* is to transmit a CSI report 235 only if the downlink message 210 is associated with a NACK (i.e., only if the UE 115-*a* fails to decode the downlink message 210), or alternatively, that the UE 115-*a* is to transmit a CSI report 235 regardless of HARQ feedback associated with the downlink message 210.

In some examples, the CSI report configuration 240 may indicate additional information or instructions for the UE 115-*a*. For instance, the CSI report configuration 240 may include an indication that the UE 115-*a* is to report HARQ feedback information for the downlink message 210, e.g., as part of the UCI message 220. Additionally, or alternatively, the CSI report configuration 240 may include an indication of information to be included in a CSI report 235, such as a CQI, an MCS, a channel rank, a minimum channel rank, or a combination thereof. In some cases, the CSI report configuration 240 may include a single bit to indicate (e.g., by the value of the bit) whether a transmitted CSI report 235 is to include a CQI or both a CQI and a channel rank. The UE 115-*a* may include information in the one or more transmitted CSI reports 235 based on the indication.

In cases where the UE 115-*a* includes CQI, MCS, or channel rank in a transmitted CSI report 235, the UE 115-*a* may determine the CQI, MCS, or channel rank for each antenna panel, a combination of antenna panels, or a subset of antenna panels. For example, the UE 115-*a* may compute a CQI or MCS based on the LLR or DMRS information associated with an antenna panel. Here, the UE 115-*a* may calculate a spectral efficiency (SPEF) of the downlink message 210, e.g., after demodulation, and may map the SPEF to a CQI or MCS. In another example, the UE 115-*a* may determine a channel rank associated with respective antenna panels, but may only report a minimum channel rank from among the channel ranks.

In some cases, the CSI report configuration 240 may include an indication of CSI reports 235 to be selected for transmission based on the antenna panels associated with respective CSI reports 235. For instance, the CSI report configuration 240 may indicate that the UE 115-*a* is to transmit the first CSI report 235-*a* associated with the first antenna panel or the second CSI report 235-*b* associated with the second antenna panel, or a combination thereof. The CSI report configuration 240 may additionally or alternatively include an indication that the UE 115-*a* is to transmit a CSI report 235 associated with a combination of antenna panels, such as the third CSI report 235-*c* associated with both the first antenna panel and the second antenna panel.

Additionally, or alternatively, the CSI report configuration 240 may include an indication that the UE 115-*a* is to select a CSI report 235 for transmission based on whether a given CSI report 235 is associated with a sounded antenna panel or an unsounded antenna panel. As an example, the CSI report configuration 240 may indicate that the UE 115-*a* is to select and transmit CSI reports 235 associated with sounded antenna panels; if the first antenna panel is sounded and the second antenna panel is unsounded, the UE 115-*a* may select the CSI report 235 associated with the first antenna panel (e.g., the first CSI report 235-*a*). This CSI report configuration 240 may additionally indicate that the UE 115-*a* is to select a CSI report 235 that is associated with a combination of antenna panels (e.g., the third CSI report 235-*c* associated with both the first antenna panel and the second antenna panel).

The CSI report configuration 240 may include one or more bitmaps, such that each bit of a given bitmap indicates whether a different CSI report 235 is to be transmitted. In some cases, each bit of a bitmap may correspond to an antenna panel or a combination of antenna panels of the UE 115-*a*, such that a value of a bit indicates whether a CSI report 235 associated with the corresponding antenna panel (s) is to be transmitted. Additionally, or alternatively, each bit of a bitmap may correspond to a sounded antenna panel, an unsounded antenna panel, or a combination of antenna panels. For instance, a value of a first bit may indicate whether to transmit a CSI report 235 associated with a sounded antenna panel, a value of a second bit may indicate whether to transmit a CSI report 235 associated with an unsounded antenna panel, and a value of a third bit may indicate whether to transmit a CSI report 235 associated with a combination of antenna panels (e.g., both the first and the second antenna panels). Table 1 below illustrates examples of various combinations of bits in a three-bit bitmap, where each bit of the bitmap corresponds to an antenna panel of the UE 115-*a*.

TABLE 1

| Bitmap | CSI reports to transmit |
| --- | --- |
| 000 | None |
| 001 | Combined antenna panels 1 and 2 |
| 010 | Antenna panel 2 |
| 011 | Antenna panel 2 and combined antenna panels 1 and 2 |
| 100 | Antenna panel 1 |
| 101 | Antenna panel 1 and combined antenna panels 1 and 2 |
| 110 | Antenna panel 1 and antenna panel 2 |
| 111 | Antenna panel 1, antenna panel 2, and combined antenna panels 1 and 2 |

Additionally, in some examples, each bitmap of the one or more bitmaps indicated by the CSI report configuration 240 may correspond to a different acknowledgment level (e.g., ACK, low-margin ACK, NACK, low-margin NACK) associated with receipt of the downlink message 210. For instance, a bitmap corresponding to an ACK may be [0,0,0], indicating that the UE 115-a is to refrain from transmitting CSI reports 235 if the downlink message 210 is successfully received. A low-margin ACK may occur when the UE 115-a successfully decodes the downlink message 210, but was relatively close (e.g., within a threshold) to failing the decoding. Similarly, a low-margin NACK may occur when an unsuccessful decoding of the downlink message 210 by the UE 115-a is relatively close to being a successful decoding. The UE 115-a may determine the acknowledgment level associated with the downlink message 210 and select CSI reports 235 for transmission based on the indications in the appropriate bitmap.

To determine the acknowledgment level of the downlink message 210, the UE 115-a may measure a signal-to-interference-plus-noise (SINR) ratio of the downlink message 210. The UE 115-a may map the measured SINR to a first MCS value, for instance, based on a target block error rate (BLER), and may compare the first MCS value with a scheduled MCS value for the downlink message 210. The difference between the first MCS value and the scheduled MCS value may determine whether the acknowledgment level is an ACK or a low-margin ACK, or a NACK or a low-margin NACK. For example, if the difference is within a threshold value (e.g., lower than a threshold value), the acknowledgment level may be a low-margin acknowledgment level; if the downlink message 210 was successfully decoded, the acknowledgment level may be a low-margin ACK, otherwise, the acknowledgment level may be a low-margin NACK. In some examples, the threshold value may be configured (e.g., via control signaling, such as the CSI report configuration 240).

In an alternative method, the UE 115-a may determine the acknowledgment level of the downlink message 210 by measuring an SINR of the downlink message 210 and identifying a scheduled MCS for the downlink message 210. The UE 115-a may map the scheduled MCS to a nominal SINR and determine a difference between the measured SINR and the nominal SINR. If the difference is within a threshold value (e.g., lower than a threshold value), the acknowledgment level may be a low-margin acknowledgment level; if the downlink message 210 was successfully decoded, the acknowledgment level may be a low-margin ACK, otherwise, the acknowledgment level may be a low-margin NACK.

In some cases, the UE 115-a may include an indication of the determined acknowledgment level in the UCI message 220, for instance, by including an additional bit in the HARQ feedback indication; a value of the additional bit may indicate whether the HARQ feedback is low-margin. If the CSI report configuration 240 included a bitmap for each respective acknowledgment level, the UE 115-a may determine the acknowledgment level and the corresponding bitmap, select CSI reports 235 to transmit based on the indications included in the corresponding bitmap, and include the selected CSI reports 235 and the indication of the acknowledgment level in the UCI message 220. In this manner, the base station 105-a may identify the CSI reports 235 included in the UCI message 220 based on the indicated acknowledgment level, e.g., the base station 105-a may be informed of the bitmap used by the UE 115-a.

The UE 115-a may determine a respective quantity of bits to use to carry CSI in each transmitted CSI report 235. A higher quantity of bits may be associated with relatively higher resolution and/or accuracy. For instance, a CSI report 235 associated with a sounded antenna panel may have a higher resolution and may be relatively more accurate when compared to an unsounded panel, and may therefore be transmitted using a higher quantity of bits (e.g., to capture the additional information due to the higher resolution). In some cases, the quantity of bits in a CSI report 235 may depend on information to be carried in the CSI report 235. For example, a CSI report 235 including only one of an MCS, a rank indicator (RI), or a CQI, may utilize fewer bits than a CSI report 235 including a combination of an MCS, RI, and CQI. Additionally, a wideband MCS, wideband RI, or wideband CQI may be respective quantities averaged over subbands and may be indicated using relatively fewer bits, for instance, than a subband MCS, subband RI, or subband CQI. A CSI report 235 associated with a combination of antenna panels (e.g., the third CSI report 235-c) may utilize fewer bits than a CSI report 235 associated with a single antenna panel (e.g., CSI report 235-a or CSI report 235-b); as an example, a CSI report 235 associated with multiple antenna panels may not be associated with a rank and may not include bits for an RI.

In some cases, the CSI report configuration 240 may explicitly indicate that the UE 115-a is to refrain from transmitting any CSI reports 235. In some examples, the UE 115-a may refrain from transmitting any CSI reports 235 if none of the criteria indicated in the CSI report configuration 240 are met. As a specific, non-limiting example, the UE 115-a may receive, in the CSI report configuration 240, an indication that the UE 115-a is to transmit a CSI report 235 if the downlink message 210 is associated with a NACK. If the UE 115-a successfully decodes the downlink message 210 (i.e., the downlink message 210 is associated with an ACK), the criterion indicated in the CSI report configuration 240 has not been met, and the UE 115-a may not transmit a CSI report 235.

The base station 105-a may receive the UCI message 220 including the HARQ feedback and the CSI reports 235. In some examples, the base station 105-a may optimize communications with the UE 115-a based on the CSI reports 235. For example, the base station 105-a may increase gain and diversity by selecting a number of layers to use for subsequent transmissions based on CQI indicated by the CSI reports 235. Additionally, the base station 105-a may select or modify one or more communications parameters, such as an MCS or precoding scheme, for subsequent transmissions (e.g., or retransmissions) to the UE 115-a. The base station 105-a may also optimize resource allocation based on the CSI reports 235, e.g., due to the increased granularity and relatively higher accuracy of the CSI reports 235.

Figure 3A:
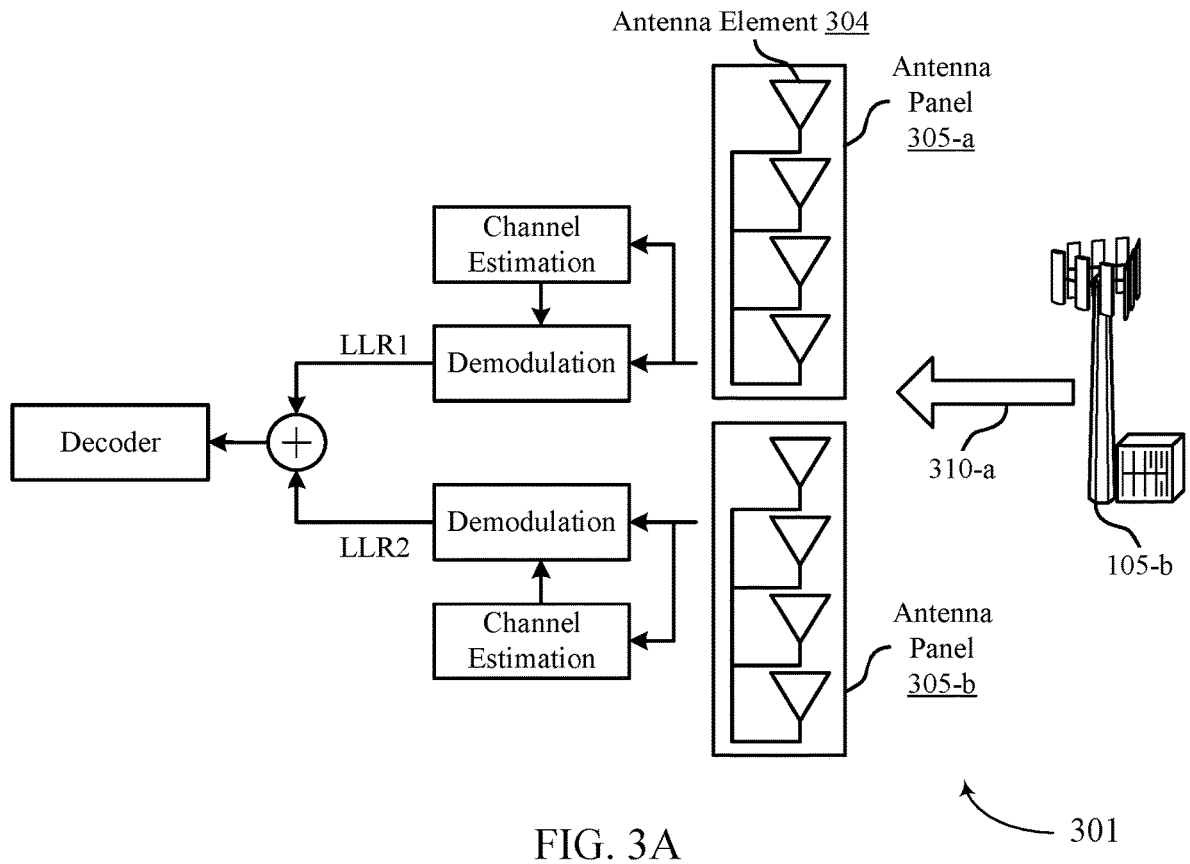
FIGS. 3A and 3B illustrate examples of device architectures that support CSI reporting for multiple panel UEs in accordance with aspects of the present disclosure.
Figure 3B:
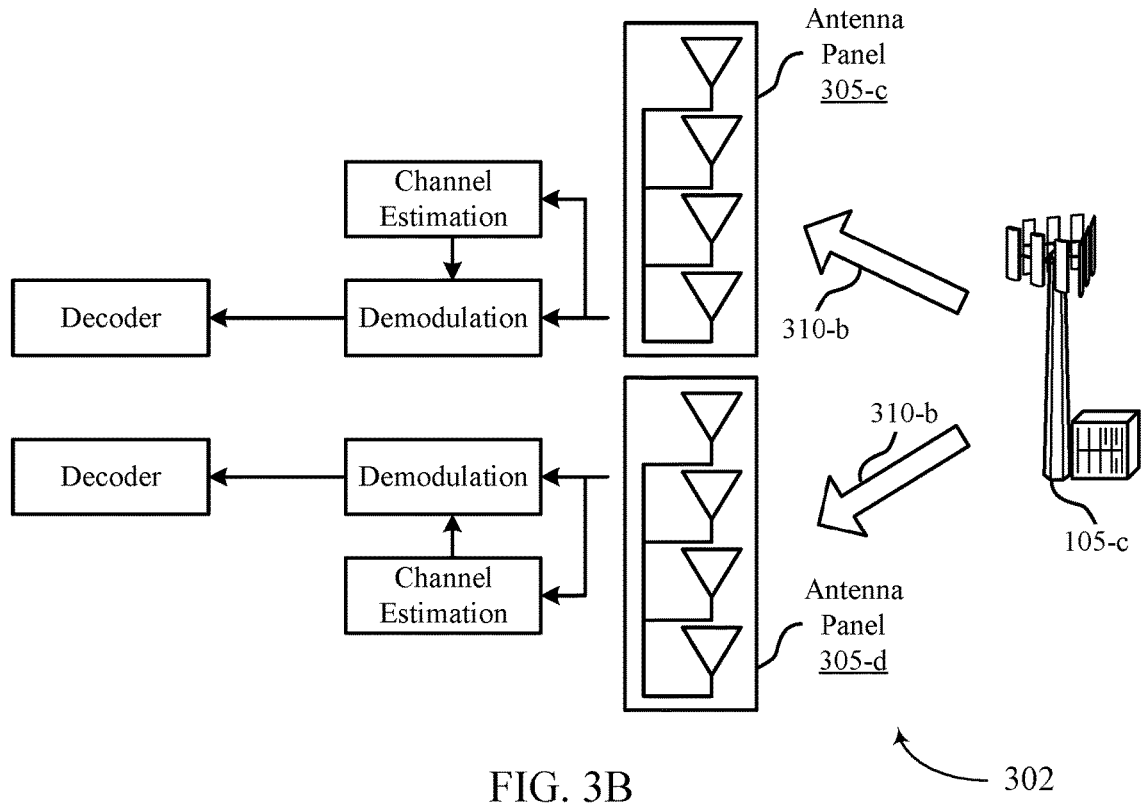

FIGS. 3A and 3B illustrate examples of device architectures 301 and 302 that support CSI reporting for multiple panel UEs in accordance with aspects of the present disclosure. In some examples, device architectures 301 and 302 may implement aspects of wireless communications systems 100 or 200. For instance, device architectures 301 and 302 may be implemented at a UE, such as a UE 115 described with reference to FIGS. 1 and 2. Although aspects of the present disclosure are described with reference to a UE 115, it is understood that the described techniques may be performed by a wireless device different from a UE 115, and the example shown should not be construed as limiting.

Device architectures 301 and 302 illustrate examples of possible RF component configurations at a device, such as a UE, that support multiple antenna elements 304 arranged on multiple antenna panels 305. As described with reference to FIG. 1, a device architecture may be associated with a demodulator mode and a level of complexity, which may be based on a number of layers supported by the device architecture and a corresponding amount of processing (e.g., baseband processing). In the example of FIG. 3, a device including a device architecture 301 or 302 may receive a signal 310 from a base station 105 via the multiple antenna elements 304 and associated antenna panels 305. The device may process the signal via a demodulator and decoder, and may perform channel estimation based on the signal processing. In the example of FIG. 3A, each antenna panel 305 may be associated with a respective demodulator but a same decoder. Alternatively, in FIG. 3B, each antenna panel 305 is associated with respective demodulators and decoders.

The quantity of layers supported by a device architecture 301 or 302 may be determined by a quantity and configuration of antenna elements 304. As illustrated, the device architectures 301 and 302 each include eight antenna elements 304; a first group of antenna elements 304 may be associated with a first antenna panel 305 (e.g., antenna panel 305-a or antenna panel 305-c) and a second group of antenna elements 304 may be associated with a second antenna panel 305 (e.g., antenna panel 305-b or antenna panel 305-d). A base station, such as a base station 105-b or 105-c, may schedule a quantity of layers for each antenna panel 305 to achieve a desired throughput. For instance, as described with reference to FIG. 2 and according to techniques described herein, a base station 105 may schedule the quantity of layers for a given antenna panel 305 based on receiving, from the device, a CSI report associated with the given antenna panel 305. In the example of FIGS. 3A and 3B, the base stations 105-b and 105-c, respectively, may schedule up to four layers to each antenna panel 305 (e.g., to each group of antenna elements 304).

The device may perform sounding at each antenna panel 305 to enable the base stations 105 to estimate channels associated with respective antenna panels 305. For example, the device may transmit, using antenna panel 305-a via an uplink channel, an SRS to the base station 105-b; the base station 105-b may estimate the uplink channel and perform link adaptation, downlink beamforming, or other procedures based on a channel reciprocity assumption. After performing sounding using the antenna panel 305-a, the antenna panel 305-a may be considered a sounded antenna panel. In some examples, the device may perform sounding using no more than four antennas, for instance, to save power at the device and/or to avoid insertion loss associated with an increased quantity of switches.

The device architecture 301 illustrated in FIG. 3A may be an example of a second demodulator mode (e.g., demodulator mode 2) that includes a respective demodulator associated with each antenna panel 305-a and 305-b. In this example, a signal 310-a received at the antenna panel 305-a may be demodulated at the corresponding demodulator; likewise, the signal 310-a received at the antenna panel 305-b may be demodulated at the demodulator associated with the antenna panel 305-b. After demodulation, the device may combine the outputs of both demodulators before decoding the signal 310-a at the decoder. Combining the outputs may increase diversity and improve performance at the device, for instance, by alleviating signal loss. That is, the antenna panel 305-a may successfully receive portions of the signal 310-a that the antenna panel 305-a failed to receive and vice versa; by combining signal information, the device may recover the lost portions of the signal 310-a.

In accordance with the techniques described herein, the device may generate a CSI report associated with the antenna panel 305-a and a CSI report associated with the antenna panel 305-b. In some examples, the CSI report may be generated based on a DMRS associated with each antenna panel 305. Additionally, or alternatively, the CSI report may be generated based on an LLR associated with each antenna panel 305, e.g., based on an output of the respective demodulators. As illustrated, the device may generate CSI for the antenna panel 305-a based on an LLR1 associated with the demodulator of the antenna panel 305-a and CSI for the antenna panel 305-b based on an LLR2 associated with the demodulator of the antenna panel 305-b. The device may generate a CSI report associated with both the antenna panel 305-a and the antenna panel 305-b based on the combining of the outputs of both demodulators, for instance, based on a combination of LLR1 and LLR2.

As described in greater detail with reference to FIG. 2, the device may select one or more CSI reports from the generated CSI reports to transmit to the base station 105-a as part of a UCI message, such as a two-stage UCI message. The device may report, as part of the one or more transmitted CSI reports, a CQI and an RI. In some examples, the device may report a same CQI and RI for both demodulators (e.g., for both antenna panels 305-a and 305-b).

The device architecture 302 illustrated in FIG. 3B may be an example of a third demodulator mode (e.g., demodulator mode 3). Similar to FIG. 3A, the device architecture 302 includes a respective demodulator associated with each antenna panel 305-c and 305-d, and a signal 310-b received at the antenna panel 305-c and the antenna panel 305-d may be demodulated at the corresponding demodulators. However, after demodulation, the device may not combine the outputs of the demodulators before decoding. In such cases, each antenna panel 310-c and 310-d may additionally include respective decoders, such that the signal 310-b received at the antenna panels 310-c and 310-d may be decoded separately. For instance, in some examples, more than four layers may be transmitted by the base station 105-c. Additionally, or alternatively, each antenna panel 305-c and 305-d may be configured to receive up to four separate layers and the base station 105-c may utilize a different precoder for each of the four layers. Thus, each decoder may separately decode the corresponding set of layers. The quantity of layers decoded and demodulated by the antenna panel 305-c may be determined by x=y=z, where z is the total number of layers scheduled at the device by the base station 105-c, and y is the number of layers decoded and demodulated by the antenna panel 305-d.

In contrast to the example of FIG. 3A, because the device does not combine signal information from both antenna panels 305-c and 305-d, the device may not generate CSI for the combination of antenna panels 305-c and 305-d. In such cases, the device may instead only generate and transmit a CSI report for antenna panel 305-c and/or a CSI report for antenna panel 305-*d*, for instance, in addition to HARQ feedback in a UCI message such as a two-stage UCI message.

Figure 4:
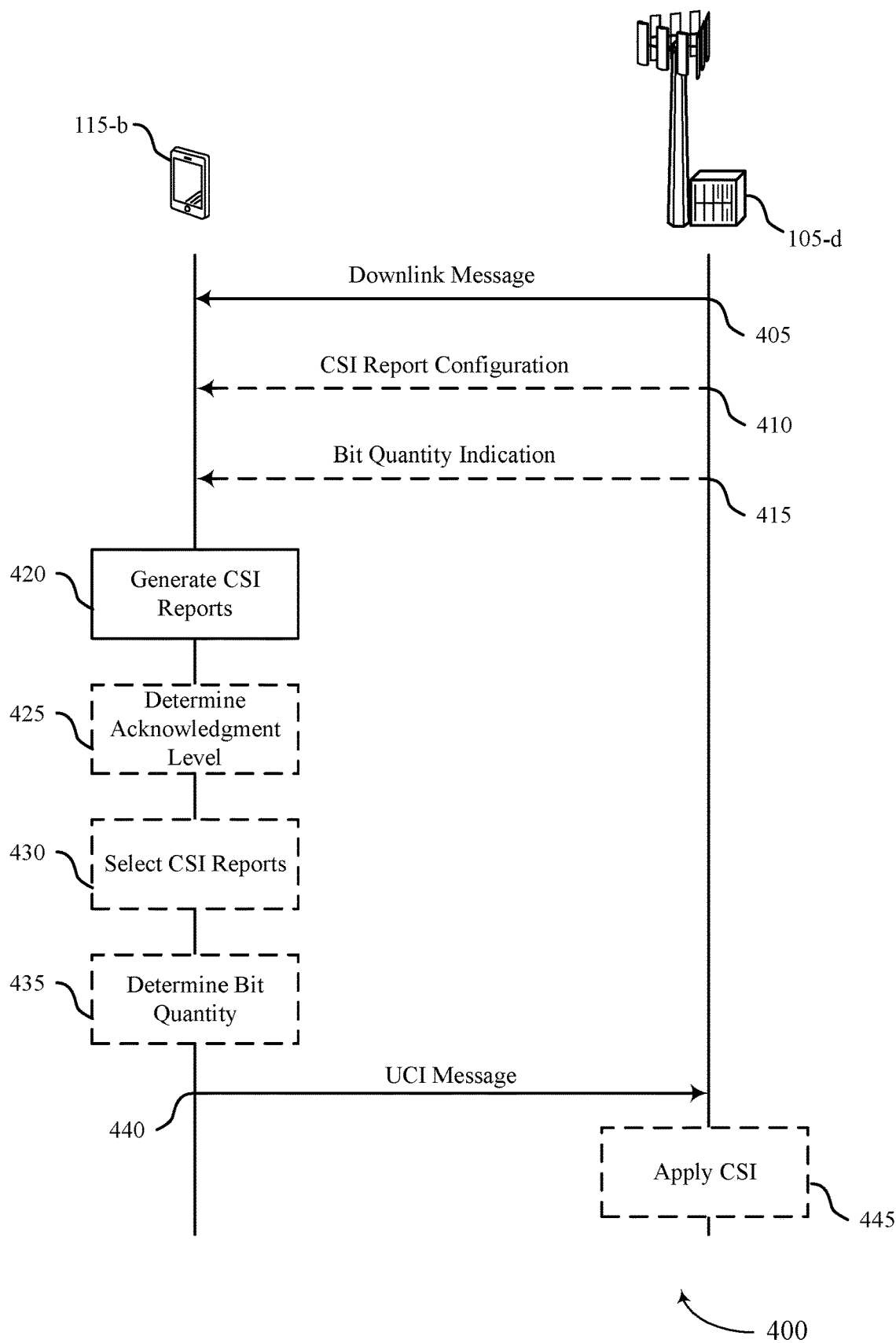
FIG. 4 illustrates an example of a process flow that supports CSI reporting for multiple panel UEs in accordance with aspects of the present disclosure.

FIG. 4 illustrates an example of a process flow 400 that supports CSI reporting for multiple panel UEs in accordance with aspects of the present disclosure. In some examples, process flow 400 may implement aspects of wireless communications systems 100 and 200. For example, process flow 400 includes a UE 115-*b* and a base station 105-*d*, which may be examples of the corresponding devices described herein. Additionally, the operations in process flow 400 performed by the UE 115-*b* and the base station 105-*d* may be respectively performed by a UE 115, a base station 105, or another wireless device, and the example shown should not be construed as limiting.

The process flow 400 illustrates a CSI reporting procedure for a UE 115-*b* having multiple (e.g., at least two) antenna panels each including multiple receive antennas. The UE 115-*b* may receive a downlink message from the base station 105-*b* via the multiple antenna panels. That is, as described with reference to FIG. 3, the UE 115-*b* may receive a same transmission on different antenna panels. The UE 115-*b* may determine CSI associated with receiving the transmission on the multiple antenna panels such that the UE 115-*b* obtains CSI for each antenna panel. For instance, the CSI for a first antenna panel may be different than the CSI for a second antenna panel. The UE 115-*b* may generate CSI reports based on the determined CSI of the one or more of the antenna panels and transmit CSI reports to the base station 105-*b*.

At 405, the base station 105-*d* may transmit, and the UE 115-*b* may receive, a downlink message (e.g., a PDSCH transmission). The UE 115-*b* may receive the downlink message via multiple receive antennas including at least a first group of receive antennas and a second group of receive antennas. The first group of receive antennas may be associated with a first antenna panel of the UE 115-*b* and the second group of receive antennas may be associated with a second antenna panel of the UE 115-*b*.

In some examples, the UE 115-*b* may successfully receive and decode the downlink message At 410, the base station 105-*d* may transmit, and the UE 115-*b* may receive, control signaling that indicates a CSI report configuration. The CSI report configuration may indicate at least one CSI report that the UE 115-*b* is to transmit. In some cases, the UE 115-*b* may receive, in the CSI report configuration, an indication that the at least one CSI report to be transmitted is associated with a sounded antenna panel, an unsounded antenna panel, or a combination of antenna panels. Additionally, or alternatively, the UE 115-*b* may receive, in the CSI report configuration, an indication that the at least one CSI report that is to be selected for transmission is to include a CQI, an MCS, a channel rank, a minimum channel rank, or a combination thereof.

In some examples, the UE 115-*b* may receive, in the CSI report configuration, an indication that the at least one CSI report that is to be selected for transmission is based at least in part on whether a NACK is associated with reception of the downlink message.

At 415, the base station 105-*d* may transmit, and the UE 115-*b* may receive, an indication of a quantity of bits to carry CSI information in each CSI report. In some examples, the indication may be transmitted by the base station 105-*d* as part of RRC signaling.

At 420, the UE 115-*b* may generate a set of two or more CSI reports based on receiving the downlink message via the multiple receive antennas. Each CSI report of the set of two or more CSI reports may be associated with at least one or the first antenna panel or the second antenna panel. For instance, the UE 115-*b* may generate a first CSI report associated with the first antenna panel and a second CSI report associated with the second antenna panel. In some examples, the UE 115-*b* may additionally generate a third CSI report that is associated with both the first antenna panel and the second antenna panel.

In some examples, the UE 115-*b* may generate the CSI reports based on one or more measurements. For example, the UE 115-*b* may generate the first CSI report associated with the first antenna panel based on a DMRS measurement at the first antenna panel, and may generate the second CSI report associated with the second antenna panel based on a DMRS measurement at the second antenna panel. Additionally, the UE 115-*b* may generate the third CSI report (e.g., associated with both the first antenna panel and the second antenna panel) based on combining a first channel impulse associated with the first antenna panel and a second channel impulse associated with the second antenna panel. Alternatively, in some examples, the UE 115-*b* may generate the third CSI report based on combining a first LLR associated with the first antenna panel and a second LLR associated with the second antenna panel.

At 425, in some examples, the UE 115-*b* may determine an acknowledgment level associated with receipt of the downlink message (e.g., at 405). The acknowledgment level may be based on whether the downlink message was successfully received and decoded (e.g., ACK or NACK). Additionally or alternatively, the acknowledgment level may be based on how close a successful decoding of the downlink message was to being an unsuccessful decoding, which may be referred to as a low-margin ACK, or how close an unsuccessful decoding of the downlink message was to being a successful decoding, which may be referred to as a low-margin NACK.

In some examples, the UE 115-*b* may determine the acknowledgment level by measuring an SINR of the downlink message and mapping the SINR to a first MCS value. Here, the UE 115-*b* may select an acknowledgment level from a set of acknowledgment levels (e.g., ACK, low-margin ACK, NACK, low-margin NACK) based on a difference between the first MCS value and an MCS scheduled for the downlink message.

Alternatively, the UE 115-*b* may determine the acknowledgment level by measuring an SINR of the downlink message, identifying a scheduled MCS value, and mapping the scheduled MCS value to a nominal SINR. In this example, the UE 115-*b* may select the acknowledgment level from a set of acknowledgment levels (e.g., ACK, low-margin ACK, NACK, low-margin NACK) based on a difference between the first SINR and the nominal SINR.

At 430, the UE 115-*b* may select CSI reports (e.g., at least one CSI report) from the set of two or more generated CSI reports for transmission to the base station 105-*d*. For example, if the UE 115-*b* received a CSI report configuration at 410, the UE 115-*b* may select at least one CSI report from the set of two or more CSI reports at 430 based on the CSI report configuration.

In some cases, the CSI report configuration may include an indication of one or more bitmaps, where each bit of the one or more bitmaps indicates whether a different CSI report (e.g., of the set of two or more CSI reports) is to be transmitted by (i.e., selected for transmission by) the UE 115-*b*, and the UE 115-*b* may select the at least one CSI report based on the indication of the one or more bitmaps.

For instance, as described in greater detail with reference to FIG. 2, a first bit of a bitmap may correspond to a CSI report associated with the first antenna panel, a second bit of the bitmap may correspond to a CSI report associated with the second antenna panel, and a third bit of the bitmap may correspond to a CSI report associated with both the first antenna panel and the second antenna panel. A value of a bit (e.g., 0 or 1) may indicate whether the corresponding CSI report is to be transmitted. As a specific, non-limiting example, the CSI report configuration may include a bitmap with values of 1, 1, and 0, where a value of 1 indicates that the CSI report should be transmitted and a value of 0 indicates that the CSI report should not be transmitted; accordingly, the UE 115-b may select the first CSI report associated with the first antenna panel and the second CSI report associated with the second antenna panel, and may refrain from selecting the third CSI report associated with both the first antenna panel and the second antenna panel.

The one or more bitmaps indicated in the CSI report configuration may, in some examples, each correspond to a respective acknowledgment level. For instance, a first bitmap may correspond to an acknowledgment level of ACK, a second bitmap may correspond to an acknowledgment level of low-margin ACK, a third bitmap may correspond to an acknowledgment level of NACK, and a fourth bitmap may correspond to an acknowledgment level of low-margin NACK. In such examples, the UE 115-b may select the at least one CSI report based on the acknowledgment level determined at 425 and the bitmap indicated in the CSI report configuration that corresponds to the determined acknowledgment level.

In some examples, the UE 115-b may select the at least one CSI report based on receiving, in the CSI report configuration, an indication to transmit CSI reports associated with a sounded antenna panel (e.g., an antenna panel from which the UE 115-b has transmitted an SRS), an unsounded antenna panel, or a combination of antenna panels. Here, the UE 115-b may select a CSI report associated with an antenna panel (e.g., the first antenna panel and/or the second antenna panel) that has a sounding status (e.g., sounded or unsounded) aligning with the indication in the CSI report configuration. As a specific, non-limiting example, the CSI report configuration may indicate that the UE 115-b is to transmit a CSI report associated with an unsounded antenna panel and a CSI report associated with the combination of the first antenna panel and the second antenna panel. The UE 115-b may select for transmission the CSI report associated with the unsounded antenna panel, which may be the first antenna panel or the second antenna panel, and the CSI report associated with the combination. In some examples, the CSI report configuration may indicate to refrain from transmitting a CSI report, such as a CSI report associated with a sounded antenna panel, and the UE 115-b may refrain from selecting the corresponding CSI report.

In some examples, the UE 115-b may select the at least one CSI report based on receiving, in the CSI report configuration, an indication to transmit the at least one CSI report based on whether a NACK is associated with reception of the downlink message. For example, the CSI report configuration may indicate that the UE 115-b is to select, for transmission, a CSI report if the downlink message is associated with a NACK, e.g., if the UE 115-b fails to successfully receive and decode the downlink message at 405.

At 435, the UE 115-b may determine a respective quantity of bits to carry CSI in each of the set of two or more CSI reports, for instance, based on receiving the bit quantity indication at 415. In some examples, the quantity of bits may be based on a sounding status of the first antenna panel and the second antenna panel. Additionally, or alternatively, the quantity of bits may be based on CSI to be included in each CSI report, such as a wideband MCS, a wideband RI, a wideband CQI, a subband MCS, a subband RI, a subband CQI, or any combination thereof.

At 440, the UE 115-b may transmit, and the base station 105-d may receive, a UCI message including the at least one CSI report of the set of two or more CSI reports. For instance, the UE 115-b may transmit the UCI including the CSI reports selected at 430. The UE 115-b may generate the UCI as a two-stage UCI, such that a first stage of the UCI includes ACK/NACK information related to reception of the downlink message and a second stage of the UCI includes the at least one CSI report. Here, the second stage may be formatted to include multiple CSI reports, e.g., to include any one or more of the first CSI report, the second CSI report, or the third CSI report. In some cases, the UE 115-b may transmit, in the UCI message, an indication of the acknowledgment level associated with the downlink message (e.g., determined at 425).

At 445, in some examples, the base station 105-d may apply the CSI in the at least one CSI reports to select or modify one or more communications parameters. For example, based on the CSI, the base station 105-d may select a quantity of layers, an MCS, a PMI, a rank, or the like, among other examples, for communications with the UE 115-b. Additionally, or alternatively, the base station 105-d may allocate resource blocks, change or reconfigure an MCS, change or reconfigure a number of layers in retransmissions and/or new transmissions, or modify one or more data precoders, or a combination thereof, based on the CSI.

Figure 5:
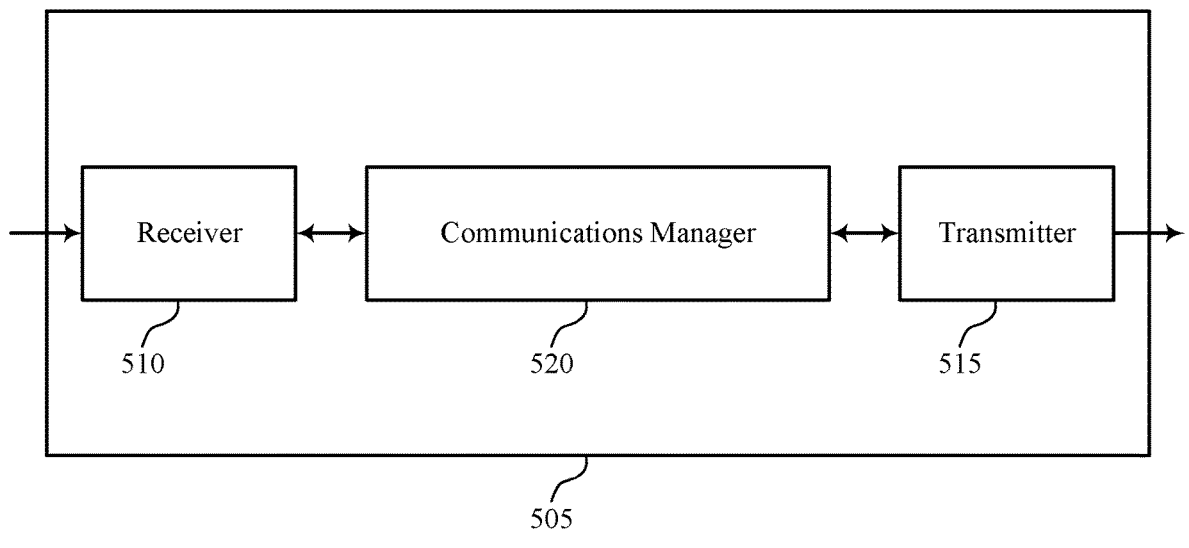
FIGS. 5 and 6 show block diagrams of devices that support CSI reporting for multiple panel UEs in accordance with aspects of the present disclosure.

FIG. 5 shows a block diagram 500 of a device 505 that supports CSI reporting for multiple panel UEs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to CSI reporting for multiple panel UEs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CSI reporting for multiple panel user equipment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of CSI reporting for multiple panel user equipment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The communications manager 520 may be configured as or otherwise support a means for generating a set of two or more CSI reports based on receiving the downlink message via the set of multiple receive antennas, each of the set of two or more CSI reports associated with at least one of the first antenna panel or the second antenna panel. The communications manager 520 may be configured as or otherwise support a means for transmitting, to the base station, an uplink control information message that includes at least one of the set of two or more CSI reports.

Additionally or alternatively, the communications manager 520 may support wireless communications at a UE in accordance with examples as disclosed herein. For example, the communications manager 520 may be configured as or otherwise support a means for a processor. The communications manager 520 may be configured as or otherwise support a means for memory coupling with the processor. The communications manager 520 may be configured as or otherwise support a means for instructions storing in the memory and executable by the processor to cause the apparatus to. The communications manager 520 may be configured as or otherwise support a means for receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The communications manager 520 may be configured as or otherwise support a means for generating a set of two or more CSI reports based on receiving the downlink message via the set of multiple receive antennas, each of the set of two or more CSI reports associated with at least one of the first antenna panel or the second antenna panel. The communications manager 520 may be configured as or otherwise support a means for transmitting, to the base station, an uplink control information message that includes at least one of the set of two or more CSI reports.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reporting CSI associated with multiple antenna panels of the device 505. For example, the device 505 may generate and report CSI associated with multiple antenna panels and/or combinations of antenna panels, thereby increasing the efficacy and accuracy of the CSI report. Put another way, generating a CSI report at increasing levels of granularity enables the device 505 to provide CSI feedback that represents the channel with relatively increased accuracy. The device 505 may therefore select appropriate communications parameters, which may in turn reduce power consumption and increase communications efficiency at the device 505.

Figure 6:
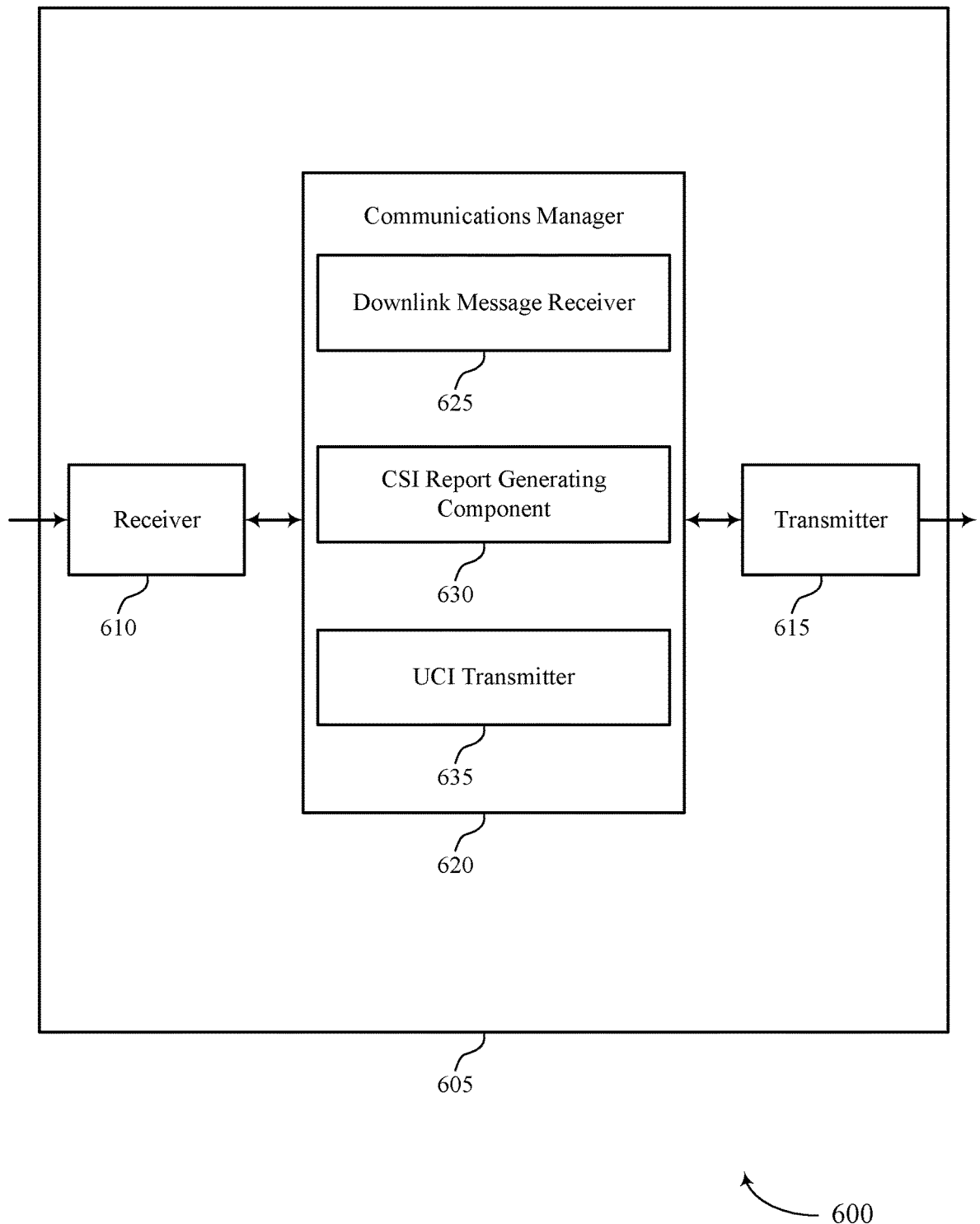

FIG. 6 shows a block diagram 600 of a device 605 that supports CSI reporting for multiple panel UEs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CSI reporting for multiple panel UEs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CSI reporting for multiple panel UEs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of CSI reporting for multiple panel UEs as described herein. For example, the communications manager 620 may include a downlink message receiver 625, a CSI report generating component 630, a UCI transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The downlink message receiver 625 may be configured as or otherwise support a means for receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The CSI report generating component 630 may be configured as or otherwise support a means for generating a set of two or more CSI reports based on receiving the downlink message via the set of multiple receive antennas, each of the set of two or more CSI reports associated with at least one of the first antenna panel or the second antenna panel. The UCI transmitter 635 may be configured as or otherwise support a means for transmitting, to the base station, an uplink control information message that includes at least one of the set of two or more CSI reports.

Figure 7:
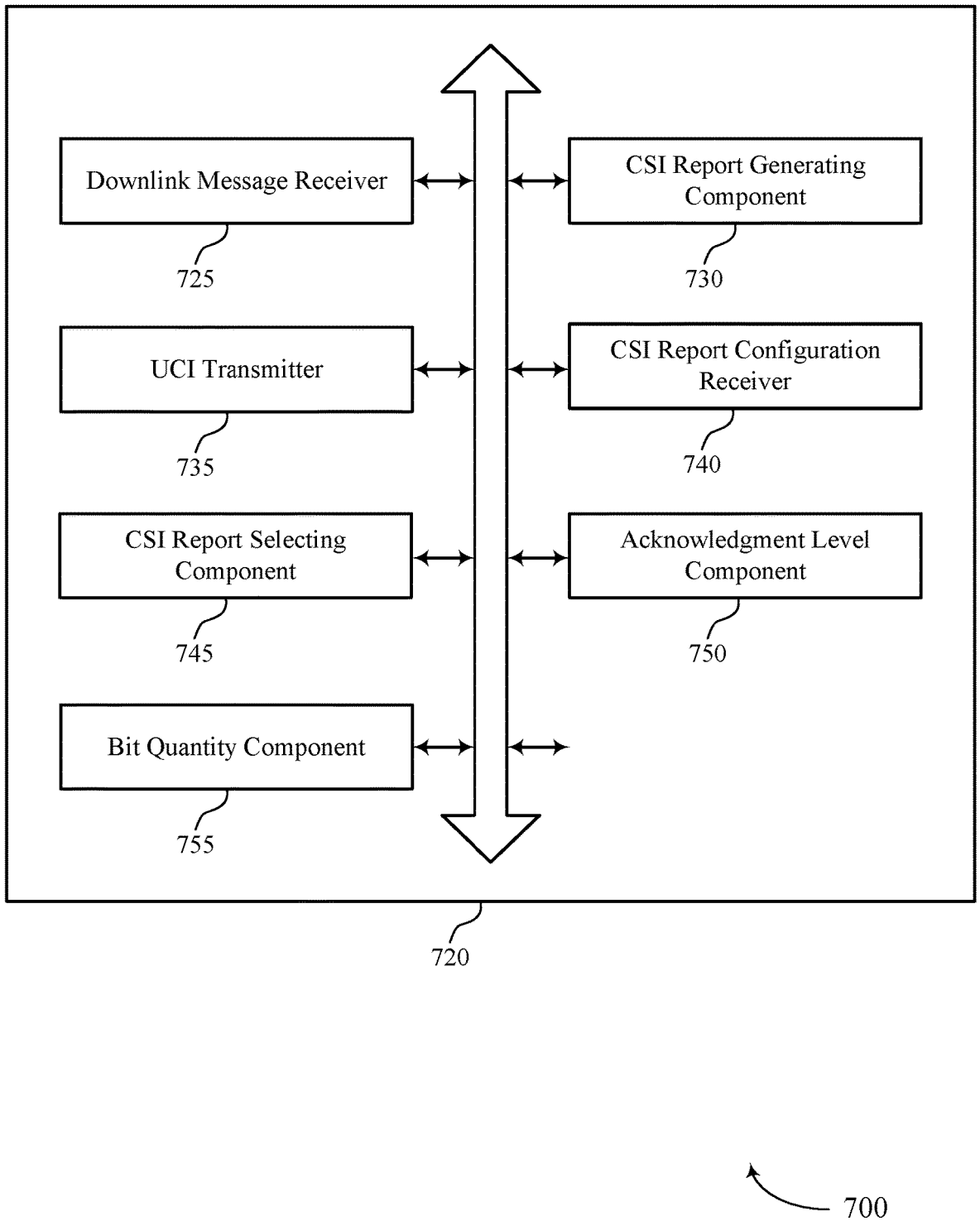
FIG. 7 shows a block diagram of a communications manager that supports CSI reporting for multiple panel UEs in accordance with aspects of the present disclosure.

FIG. 7 shows a block diagram 700 of a communications manager 720 that supports CSI reporting for multiple panel UEs in accordance with aspects of the present disclosure. The communications manager 720 may be an example of aspects of a communications manager 520, a communications manager 620, or both, as described herein. The communications manager 720, or various components thereof, may be an example of means for performing various aspects of CSI reporting for multiple panel user equipment as described herein. For example, the communications manager 720 may include a downlink message receiver 725, a CSI report generating component 730, a UCI transmitter 735, a CSI report configuration receiver 740, a CSI report selecting component 745, a bit quantity component 750, an acknowledgment level component 755, or any combination thereof. Each of these components may communicate, directly or indirectly, with one another (e.g., via one or more buses).

The communications manager 720 may support wireless communications at a UE in accordance with examples as disclosed herein. The downlink message receiver 725 may be configured as or otherwise support a means for receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The CSI report generating component 730 may be configured as or otherwise support a means for generating a set of two or more CSI reports based on receiving the downlink message via the set of multiple receive antennas, each of the set of two or more CSI reports associated with at least one of the first antenna panel or the second antenna panel. The UCI transmitter 735 may be configured as or otherwise support a means for transmitting, to the base station, an uplink control information message that includes at least one of the set of two or more CSI reports.

In some examples, to support generating the set of two or more CSI reports, the CSI report generating component 730 may be configured as or otherwise support a means for generating at least a first CSI report associated with the first antenna panel and a second CSI report associated with the second antenna panel.

In some examples, to support generating at least the first CSI report and the second CSI report, the CSI report generating component 730 may be configured as or otherwise support a means for generating the first CSI report based on a demodulation reference signal measurement at the first antenna panel. In some examples, to support generating at least the first CSI report and the second CSI report, the CSI report generating component 730 may be configured as or otherwise support a means for generating the second CSI report based on a demodulation reference signal measurement at the second antenna panel.

In some examples, to support generating the set of two or more CSI reports, the CSI report generating component 730 may be configured as or otherwise support a means for generating a third CSI report associated with both the first antenna panel and the second antenna panel based on combining a first channel impulse associated with the first antenna panel and a second channel impulse associated with the second antenna panel, or combining a first log-likelihood ratio associated with the first antenna panel and a second log-likelihood ratio associated with the second antenna panel.

In some examples, the CSI report configuration receiver 740 may be configured as or otherwise support a means for receiving control signaling indicating a CSI report configuration that indicates the at least one of the set of two or more CSI reports to be transmitted. In some examples, the CSI report selecting component 745 may be configured as or otherwise support a means for selecting the at least one of the set of two or more CSI reports based on the CSI report configuration.

In some examples, to support selecting the at least one of the set of two or more CSI reports, the CSI report selecting component 745 may be configured as or otherwise support a means for selecting the at least one of the set of two or more CSI reports based on one or more bitmaps indicated by the CSI report configuration, each bit of the one or more bitmaps indicating whether a different CSI report of the set of two or more CSI reports is to be transmitted.

In some examples, the acknowledgment level component 750 may be configured as or otherwise support a means for determining an acknowledgment level associated with receipt of the downlink message, each acknowledgment level based on either how close a successful decoding of the downlink message was to being an unsuccessful decoding, or how close an unsuccessful decoding of the downlink message was to being a successful decoding, where each bitmap of the one or more bitmaps corresponds to a different acknowledgement level.

In some examples, to support determining the acknowledgment level, the acknowledgment level component 750 may be configured as or otherwise support a means for measuring a signal-to-interference-plus-noise ratio of the downlink message. In some examples, to support determining the acknowledgment level, the acknowledgment level component 750 may be configured as or otherwise support a means for mapping the signal-to-interference-plus-noise ratio to a first modulation and coding scheme value. In some examples, to support determining the acknowledgment level, the acknowledgment level component 750 may be configured as or otherwise support a means for selecting the acknowledgment level from a set of multiple acknowledgment levels based on a difference between the first modulation and coding scheme value and a scheduled modulation and coding scheme value for the downlink message.

In some examples, to support determining the acknowledgment level, the acknowledgment level component 750 may be configured as or otherwise support a means for measuring a first signal-to-interference-plus-noise ratio of the downlink message. In some examples, to support determining the acknowledgment level, the acknowledgment level component 750 may be configured as or otherwise support a means for identifying a scheduled modulation and coding scheme value for the downlink message. In some examples, to support determining the acknowledgment level, the acknowledgment level component 750 may be configured as or otherwise support a means for mapping the scheduled modulation and coding scheme value to a nominal signal-to-interference-plus-noise ratio. In some examples, to support determining the acknowledgment level, the acknowledgment level component 750 may be configured as or otherwise support a means for selecting the acknowledgment level from a set of multiple acknowledgment levels based on a difference between the first signal-to-interference-plus-noise ratio and the nominal signal-to-interference-plus-noise ratio.

In some examples, to support transmitting the uplink control information message, the UCI transmitter 735 may be configured as or otherwise support a means for transmitting, in the uplink control information message, an indication of the acknowledgement level associated with the downlink message.

In some examples, to support receiving the control signaling indicating the CSI report configuration, the CSI report configuration receiver 740 may be configured as or otherwise support a means for receiving an indication in the CSI report configuration that the at least one of the set of two or more CSI reports that is to be selected for transmission is based on whether individual ones of the set of two or more CSI reports are associated with a sounded panel of the first antenna panel or the second antenna panel, an unsounded panel of the first antenna panel or the second antenna panel, or a combination of the first antenna panel and the second antenna panel.

In some examples, to support receiving the control signaling indicating the CSI report configuration, the CSI report configuration receiver 740 may be configured as or otherwise support a means for receiving an indication in the CSI report configuration that the at least one of the set of two or more CSI reports that is to be selected for transmission includes a channel quality indicator, a modulation and coding scheme, a channel rank, a minimum channel rank, or a combination thereof.

In some examples, to support receiving the control signaling indicating the CSI report configuration, the CSI report configuration receiver 740 may be configured as or otherwise support a means for receiving an indication in the CSI report configuration that the at least one of the set of two or more CSI reports that is to be selected for transmission is based on whether a negative acknowledgement is associated with reception of the downlink message.

In some examples, the UCI transmitter 735 may be configured as or otherwise support a means for generating the uplink control information message as a two-stage uplink control information message, where a first stage of the two-stage uplink control information message includes acknowledgment or negative acknowledgment information pertaining to reception of the downlink message, and where a second stage of the two-stage uplink control information message includes the at least one of the set of two or more CSI reports.

In some examples, the second stage of the two-stage uplink control information message is formatted to include any one or more of a first CSI report, a second CSI report, or a third CSI report.

In some examples, the bit quantity component 755 may be configured as or otherwise support a means for determining a respective quantity of bits to carry CSI in each of the set of two or more CSI reports. In some examples, each quantity of bits is based on a sounding status of the first antenna panel and the second antenna panel. In some examples, each quantity of bits is based on whether the CSI carried in each report is to include a wideband MCS, a wideband RI, a wideband CQI, a subband MCS, a subband RI, a subband CQI, or combinations thereof.

In some examples, to support determining the respective quantity of bits, the bit quantity component 755 may be configured as or otherwise support a means for receiving an indication of each quantity of bits via RRC signaling.

Figure 8:
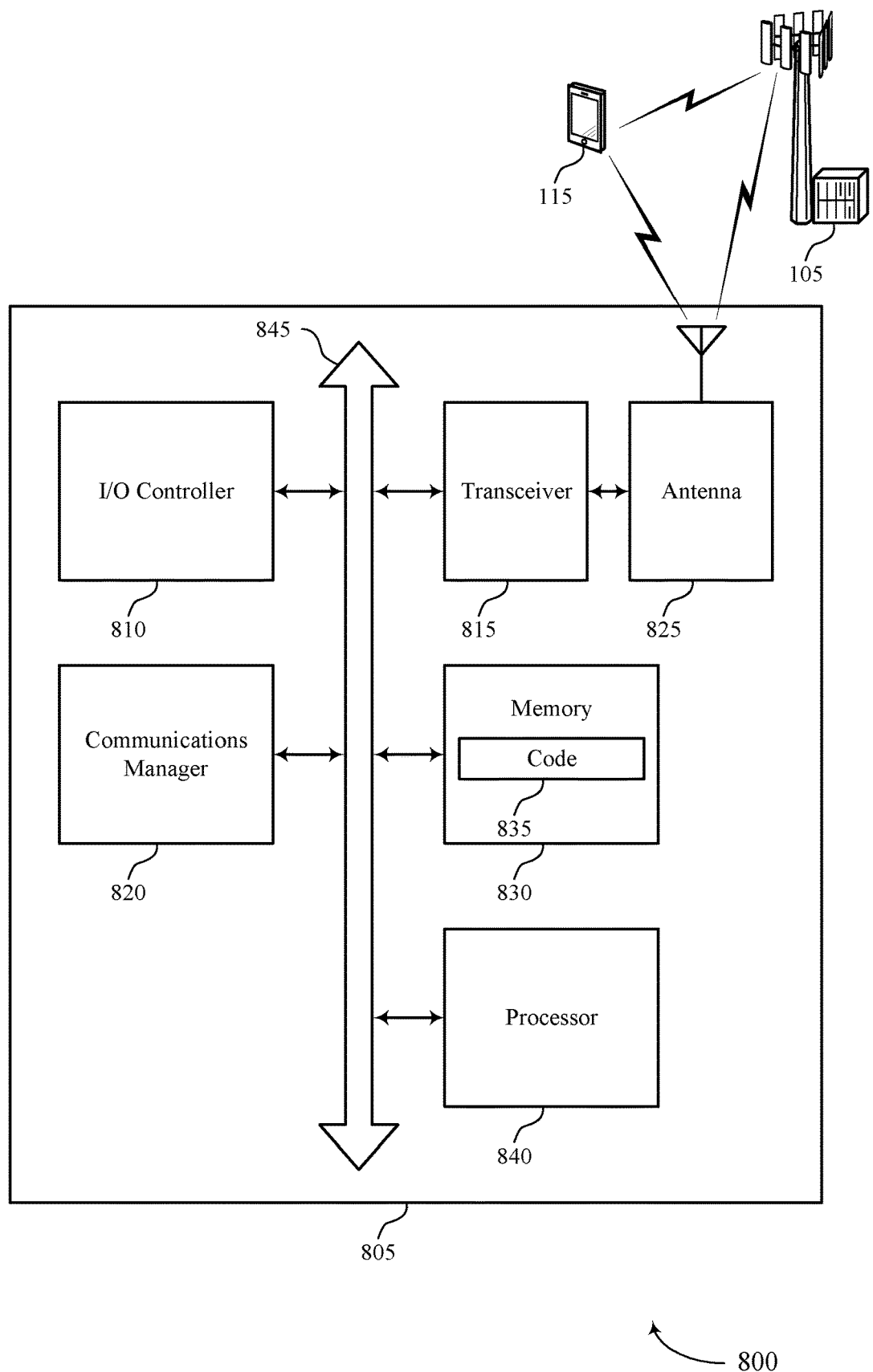
FIG. 8 shows a diagram of a system including a device that supports CSI reporting for multiple panel UEs in accordance with aspects of the present disclosure.

FIG. 8 shows a diagram of a system 800 including a device 805 that supports CSI reporting for multiple panel UEs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting CSI reporting for multiple panel user equipment). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The communications manager 820 may be configured as or otherwise support a means for generating a set of two or more CSI reports based on receiving the downlink message via the set of multiple receive antennas, each of the set of two or more CSI reports associated with at least one of the first antenna panel or the second antenna panel. The communications manager 820 may be configured as or otherwise support a means for transmitting, to the base station, an uplink control information message that includes at least one of the set of two or more CSI reports.

Additionally or alternatively, the communications manager 820 may support wireless communications at a UE in accordance with examples as disclosed herein. For example, the communications manager 820 may be configured as or otherwise support a means for a processor. The communications manager 820 may be configured as or otherwise support a means for memory coupling with the processor. The communications manager 820 may be configured as or otherwise support a means for instructions storing in the memory and executable by the processor to cause the apparatus to. The communications manager 820 may be configured as or otherwise support a means for receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The communications manager 820 may be configured as or otherwise support a means for generating a set of two or more CSI reports based on receiving the downlink message via the set of multiple receive antennas, each of the set of two or more CSI reports associated with at least one of the first antenna panel or the second antenna panel. The communications manager 820 may be configured as or otherwise support a means for transmitting, to the base station, an uplink control information message that includes at least one of the set of two or more CSI reports.

By including or configuring the communications manager 820 in accordance with examples as described herein, the device 805 may support techniques for reporting CSI associated with antenna panels or combinations of antenna panels at the device 805. For example, the device 805 may generate and report CSI at increasing levels of granularity with respect to the antenna panels, such that the CSI may represent the channel with relatively increased accuracy. Increasing accuracy and efficacy of CSI may enable the device 805, and other devices with which the device 805 communicates (e.g., base stations 105, etc.), to perform more efficient link adaptation procedures, which in turn may increase communications reliability and efficiency in the system.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of CSI reporting for multiple panel user equipment as described herein, or the processor 840 and the memory 830 may be otherwise configured to perform or support such operations.

Figure 9:
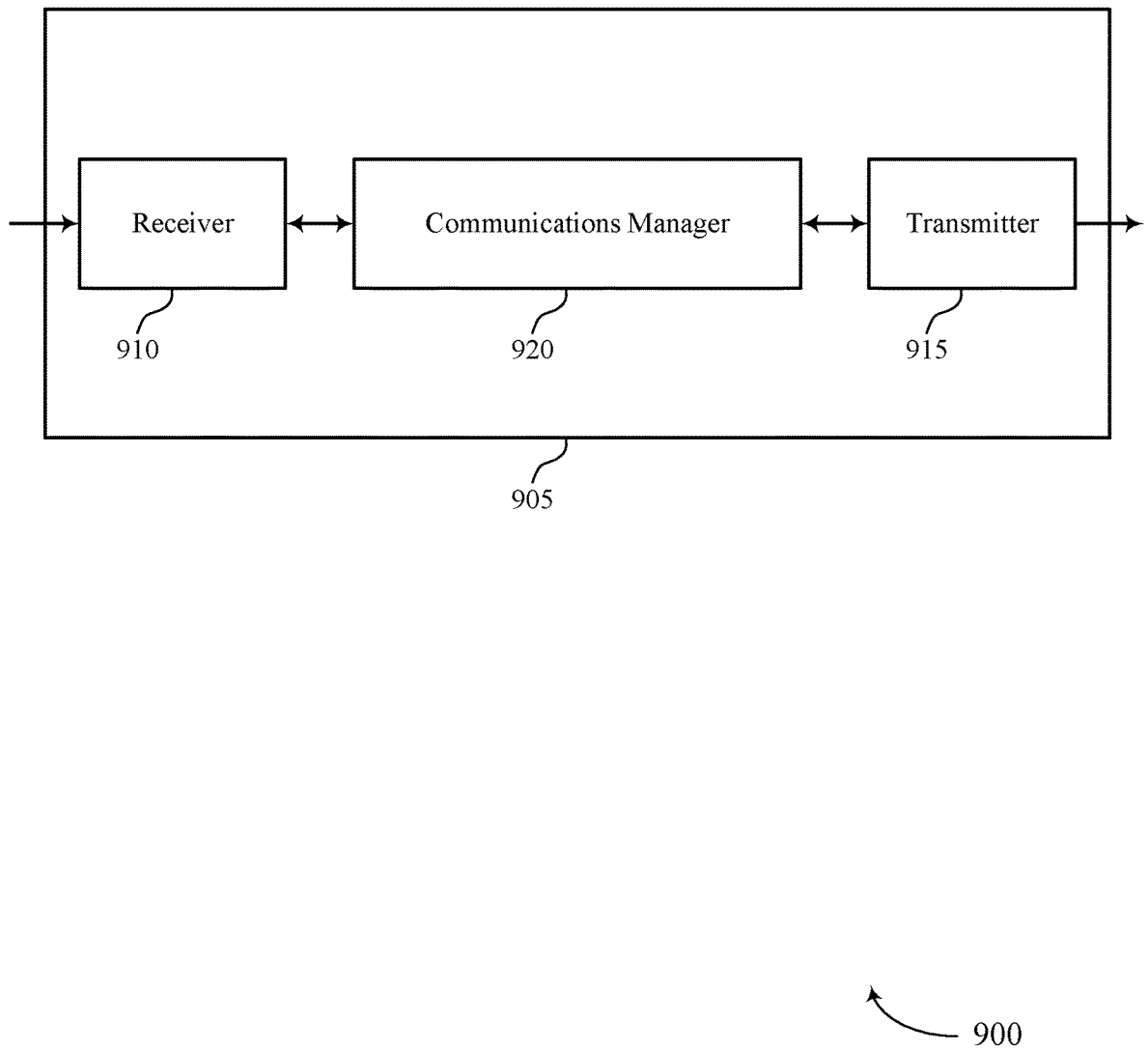
FIGS. 9 and 10 show block diagrams of devices that support CSI reporting for multiple panel UEs in accordance with aspects of the present disclosure.

FIG. 9 shows a block diagram 900 of a device 905 that supports CSI reporting for multiple panel UEs in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to CSI reporting for multiple panel UEs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to CSI reporting for multiple panel UEs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of CSI reporting for multiple panel UEs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting a downlink message to a UE that includes a set of multiple receive antennas that include a first group of receive antennas associated with a first antenna panel of the UE and a second group of receive antennas associated with a second antenna panel of the UE. The communications manager 920 may be configured as or otherwise support a means for receiving, from the UE, an uplink control information message that includes at least one CSI report based on the downlink message, the at least one CSI report associated with either the first antenna panel of the UE, the second antenna panel of the UE, or both the first antenna panel and the second antenna panel.

Additionally or alternatively, the communications manager 920 may support wireless communications at a base station in accordance with examples as disclosed herein. For example, the communications manager 920 may be configured as or otherwise support a means for a processor. The communications manager 920 may be configured as or otherwise support a means for memory coupling with the processor. The communications manager 920 may be configured as or otherwise support a means for instructions storing in the memory and executable by the processor to cause the apparatus to. The communications manager 920 may be configured as or otherwise support a means for transmitting a downlink message to a UE that includes a set of multiple receive antennas that include a first group of receive antennas associated with a first antenna panel of the UE and a second group of receive antennas associated with a second antenna panel of the UE. The communications manager 920 may be configured as or otherwise support a means for receiving, from the UE, an uplink control information message that includes at least one CSI report based on the downlink message, the at least one CSI report associated with either the first antenna panel of the UE, the second antenna panel of the UE, or both the first antenna panel and the second antenna panel.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for channel estimation in consideration of multiple antenna panels at a UE with which the device 905 communicates. For instance, the device 905 may optimize communications with the UE by modifying or adjusting parameters based on CSI reported by the UE, thereby increasing communications reliability and efficiency. Improved reliability and efficiency may further enable the device 905 to additionally avoid potential retransmissions or other losses, reducing processing and power consumption at the device 905.

Figure 10:
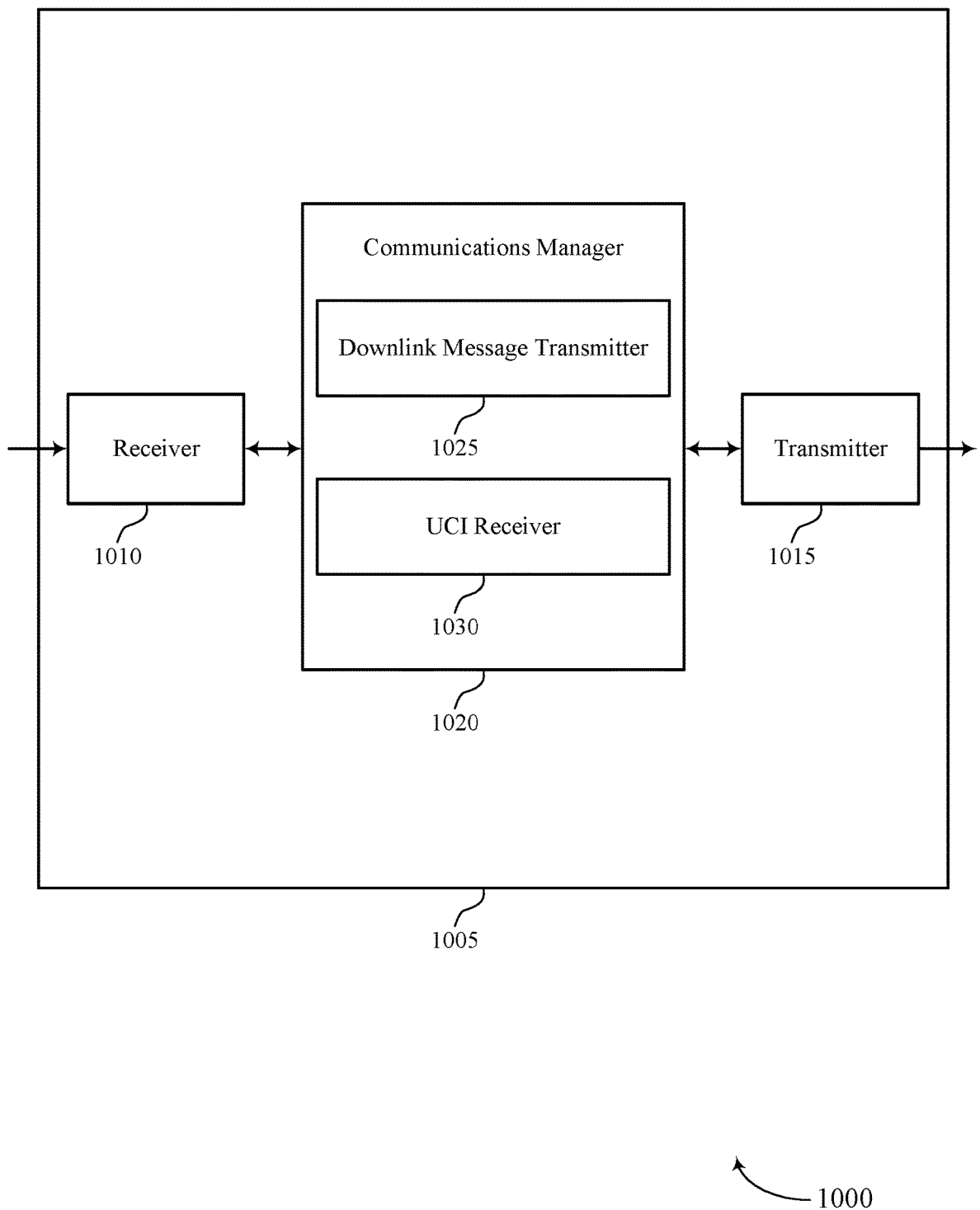

FIG. 10 shows a block diagram 1000 of a device 1005 that supports CSI reporting for multiple panel UEs in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to CSI reporting for multiple panel UEs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to CSI reporting for multiple panel user equipment). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of CSI reporting for multiple panel UEs as described herein. For example, the communications manager 1020 may include a downlink message transmitter 1025, a UCI receiver 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The downlink message transmitter 1025 may be configured as or otherwise support a means for transmitting a downlink message to a UE that includes a set of multiple receive antennas that include a first group of receive antennas associated with a first antenna panel of the UE and a second group of receive antennas associated with a second antenna panel of the UE. The UCI receiver 1030 may be configured as or otherwise support a means for receiving, from the UE, an uplink control information message that includes at least one CSI report based on the downlink message, the at least one CSI report associated with either the first antenna panel of the UE, the second antenna panel of the UE, or both the first antenna panel and the second antenna panel.

Figure 11:
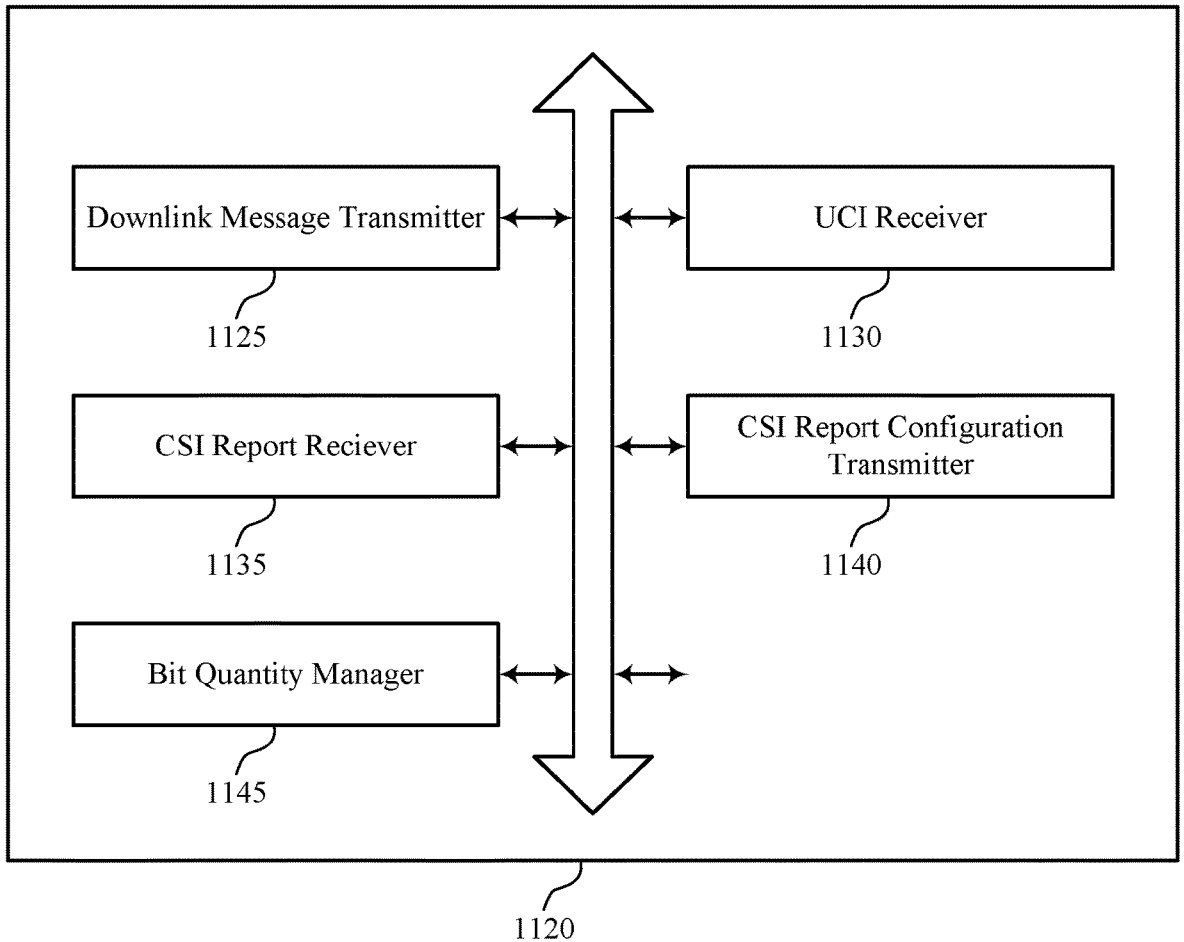
FIG. 11 shows a block diagram of a communications manager that supports CSI reporting for multiple panel UEs in accordance with aspects of the present disclosure.

FIG. 11 shows a block diagram 1100 of a communications manager 1120 that supports CSI reporting for multiple panel UEs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of CSI reporting for multiple panel user equipment as described herein. For example, the communications manager 1120 may include a downlink message transmitter 1125, a UCI receiver 1130, a CSI report receiver 1135, a CSI report configuration transmitter 1140, a bit quantity manager 1145, or any combination thereof. Each of these components may communicate, directly or indirectly, with one another (e.g., via one or more buses).

The communications manager 1120 may support wireless communications at a base station in accordance with examples as disclosed herein. The downlink message transmitter 1125 may be configured as or otherwise support a means for transmitting a downlink message to a UE that includes a set of multiple receive antennas that include a first group of receive antennas associated with a first antenna panel of the UE and a second group of receive antennas associated with a second antenna panel of the UE. The UCI receiver 1130 may be configured as or otherwise support a means for receiving, from the UE, an uplink control information message that includes at least one CSI report based on the downlink message, the at least one CSI report associated with either the first antenna panel of the UE, the second antenna panel of the UE, or both the first antenna panel and the second antenna panel.

In some examples, to support receiving the at least one CSI report, the CSI report receiver 1135 may be configured as or otherwise support a means for receiving at least a first CSI report associated with the first antenna panel of the UE and a second CSI report associated with the second antenna panel of the UE.

In some examples, to support receiving the at least one CSI report, the CSI report receiver 1135 may be configured as or otherwise support a means for receiving a third CSI report associated with both the first antenna panel of the UE and the second antenna panel of the UE.

In some examples, the CSI report configuration transmitter 1140 may be configured as or otherwise support a means for transmitting control signaling indicating a CSI report configuration that indicates the at least one CSI report. In some examples, the CSI report receiver 1135 may be configured as or otherwise support a means for receiving the at least one CSI report based on the CSI report configuration.

In some examples, to support transmitting control signaling indicating the CSI report configuration, the CSI report configuration transmitter 1140 may be configured as or otherwise support a means for transmitting, as part of the CSI report configuration, an indication of one or more bitmaps, each bit of the one or more bitmaps indicating whether a different CSI report is to be transmitted.

In some examples, to support transmitting control signaling indicating the CSI report configuration, the CSI report configuration transmitter 1140 may be configured as or otherwise support a means for transmitting, as part of the CSI report configuration, an indication that the at least one CSI report includes a channel quality indicator, a modulation and coding scheme, a channel rank, a minimum channel rank, or a combination thereof.

In some examples, the UCI receiver 1130 may be configured as or otherwise support a means for receiving the uplink control information message as a two-stage uplink control information message, where a first stage of the two-stage uplink control information message includes acknowledgment or negative acknowledgment information pertaining to reception of the downlink message, and where a second stage of the two-stage uplink control information message includes the at least one CSI report.

In some examples, the second stage of the two-stage uplink control information message is formatted to include any one or more of a first CSI report, a second CSI report, or a third CSI report.

In some examples, the bit quantity manager 1145 may be configured as or otherwise support a means for transmitting, via radio resource control signaling, an indication of a respective quantity of bits to carry CSI included in the at least one CSI report.

Figure 12:
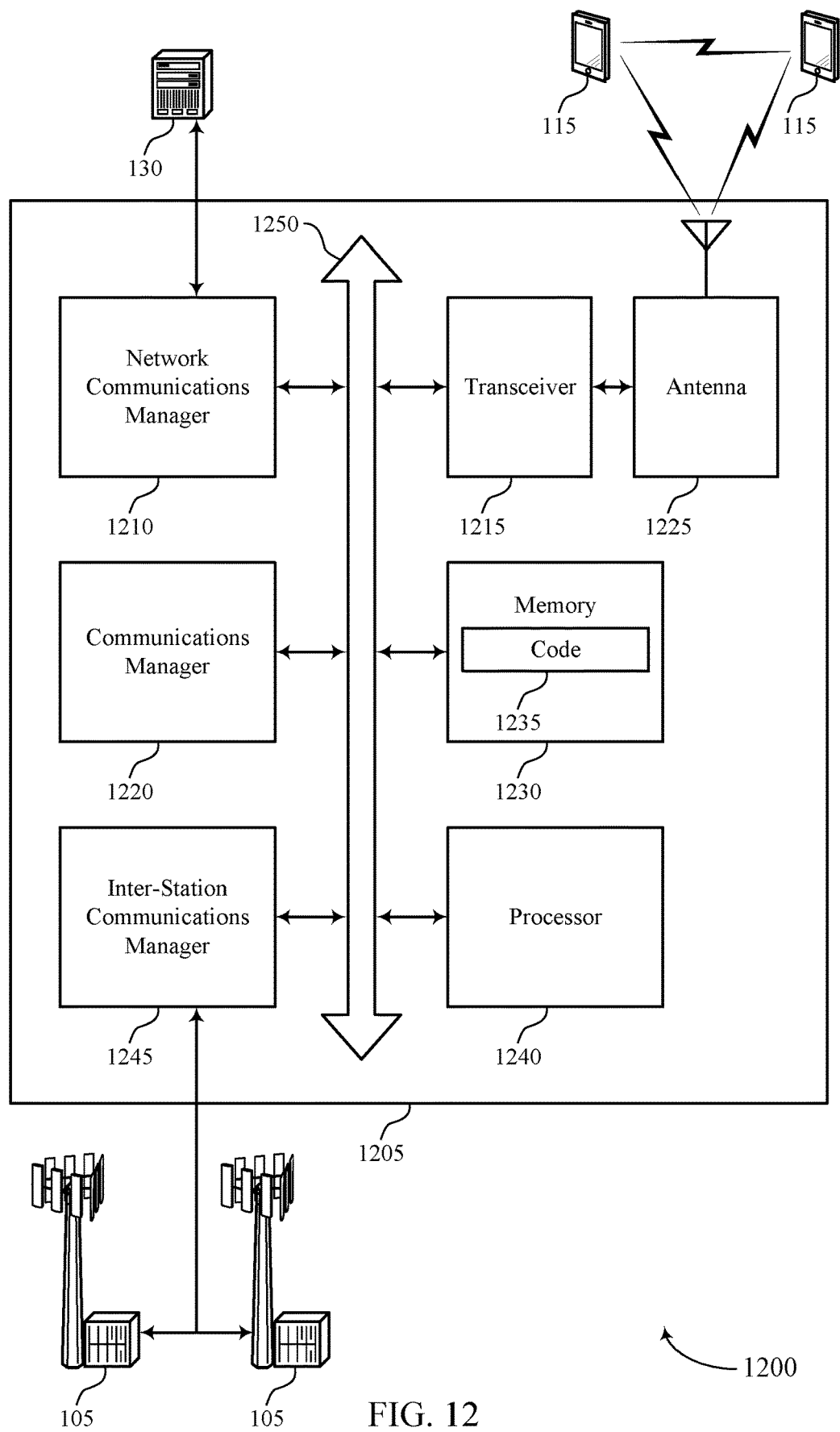
FIG. 12 shows a diagram of a system including a device that supports CSI reporting for multiple panel UEs in accordance with aspects of the present disclosure.

FIG. 12 shows a diagram of a system 1200 including a device 1205 that supports CSI reporting for multiple panel UEs in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting CSI reporting for multiple panel user equipment). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting a downlink message to a UE that includes a set of multiple receive antennas that include a first group of receive antennas associated with a first antenna panel of the UE and a second group of receive antennas associated with a second antenna panel of the UE. The communications manager 1220 may be configured as or otherwise support a means for receiving, from the UE, an uplink control information message that includes at least one CSI report based on the downlink message, the at least one CSI report associated with either the first antenna panel of the UE, the second antenna panel of the UE, or both the first antenna panel and the second antenna panel.

By including or configuring the communications manager 1220 in accordance with examples as described herein, the device 1205 may support techniques for channel estimation in consideration of multiple antenna panels at a UE with which the device 1205 communicates. For instance, the device 1205 may configure a UE, such as a UE 115, with a CSI report configuration that indicates CSI reports for the UE 115 to transmit. The device 1205 may therefore receive CSI reports from the UE 115 associated with respective antenna panels or combinations of antenna panels at the UE 115. These increased levels of granularity in CSI reports may enable the device 1205 to perform more effective and accurate link adaptation procedures. For example, the device 1205 may adjust one or more parameters for communications with the UE 115 based on one or more received CSI reports, which may increase communications efficiency and reliability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of CSI reporting for multiple panel user equipment as described herein, or the processor 1240 and the memory 1230 may be otherwise configured to perform or support such operations.

Figure 13:
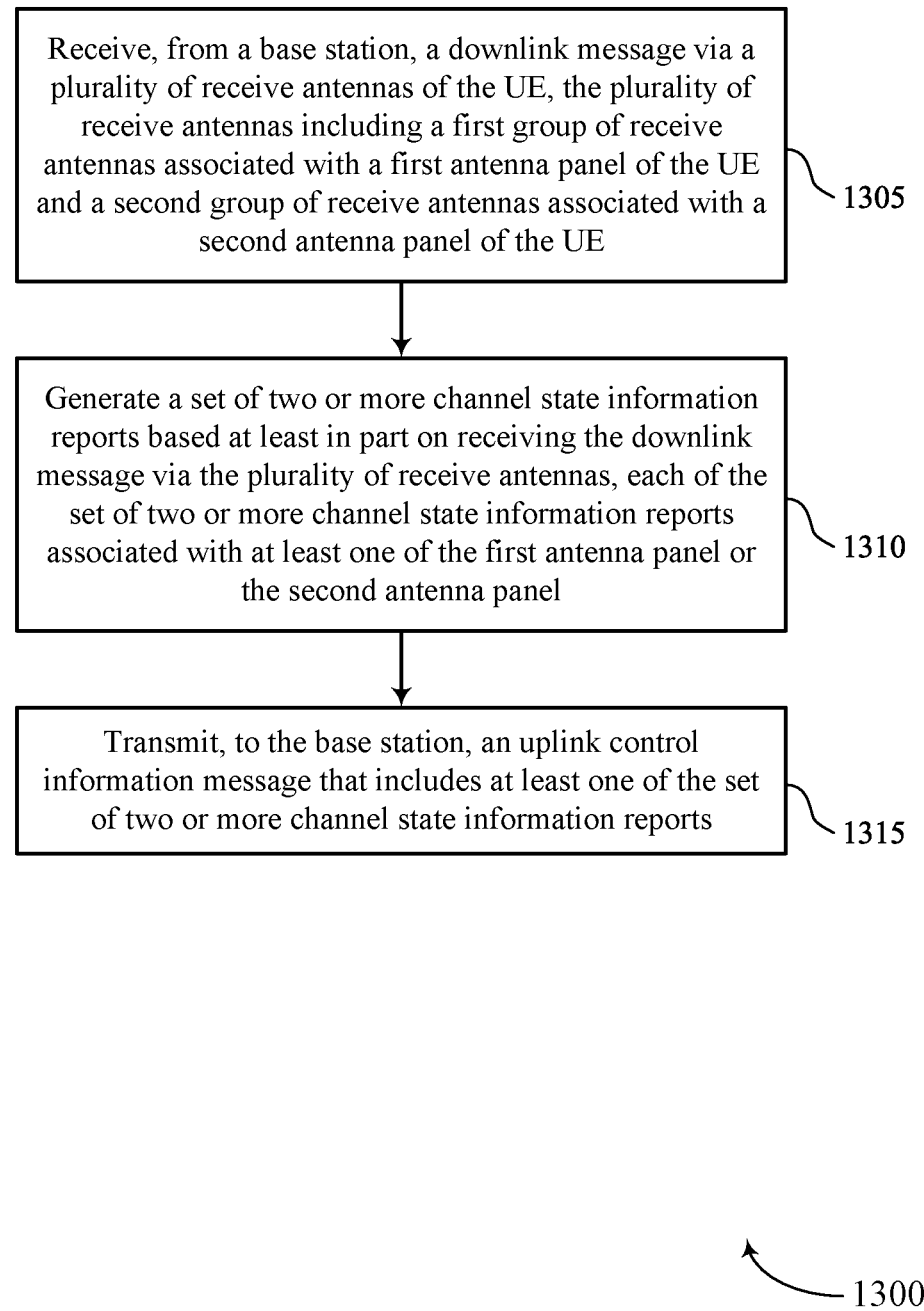
FIGS. 13 through 16 show flowcharts illustrating methods that support CSI reporting for multiple panel UEs in accordance with aspects of the present disclosure.

FIG. 13 shows a flowchart illustrating a method 1300 that supports CSI reporting for multiple panel UEs in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions.

Additionally or alternatively, the UE may perform aspects of the described functions using special-purpose hardware.

At 1305, the method may include receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The operations of 1305 may be performed in accordance with examples as disclosed herein. In some examples, aspects of the operations of 1305 may be performed by a downlink message receiver 725 as described with reference to FIG. 7.

At 1310, the method may include generating a set of two or more CSI reports based on receiving the downlink message via the set of multiple receive antennas, each of the set of two or more CSI reports associated with at least one of the first antenna panel or the second antenna panel. The operations of 1310 may be performed in accordance with examples as disclosed herein. In some examples, aspects of the operations of 1310 may be performed by a CSI report generating component 730 as described with reference to FIG. 7.

At 1315, the method may include transmitting, to the base station, an uplink control information message that includes at least one of the set of two or more CSI reports. The operations of 1315 may be performed in accordance with examples as disclosed herein. In some examples, aspects of the operations of 1315 may be performed by a UCI transmitter 735 as described with reference to FIG. 7.

Figure 14:
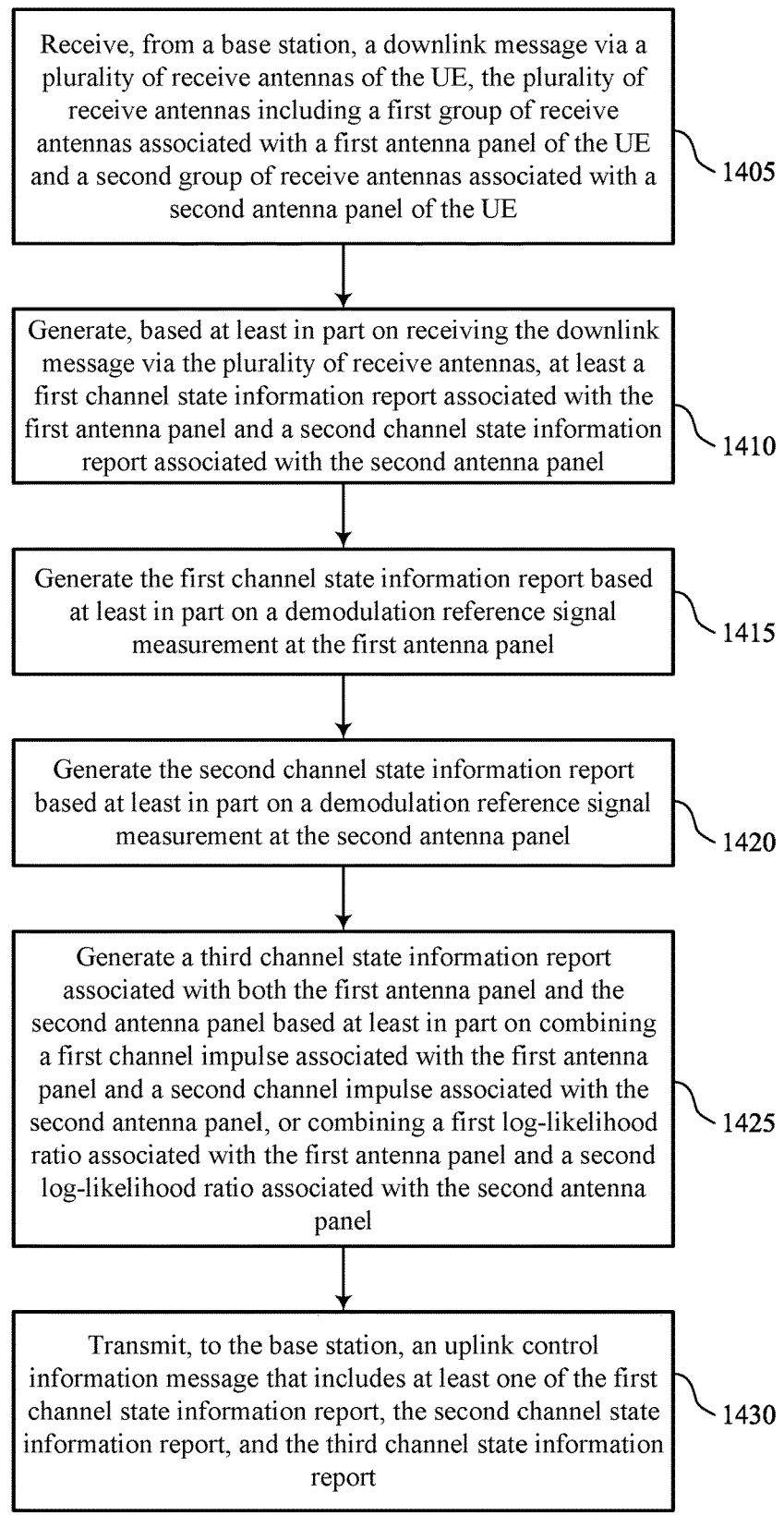

FIG. 14 shows a flowchart illustrating a method 1400 that supports CSI reporting for multiple panel UEs in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a downlink message via a set of multiple receive antennas of the UE, the set of multiple receive antennas including a first group of receive antennas associated with a first antenna panel of the UE and a second group of receive antennas associated with a second antenna panel of the UE. The operations of 1405 may be performed in accordance with examples as disclosed herein. In some examples, aspects of the operations of 1405 may be performed by a downlink message receiver 725 as described with reference to FIG. 7.

At 1410, the method may include generating, based on receiving the downlink message via the set of multiple receive antennas, at least a first CSI report associated with the first antenna panel and a second CSI report associated with the second antenna panel. The operations of 1410 may be performed in accordance with examples as disclosed herein. In some examples, aspects of the operations of 1410 may be performed by a CSI report generating component 730 as described with reference to FIG. 7.

At 1415, the method may include generating the first CSI report based on a demodulation reference signal measurement at the first antenna panel. The operations of 1415 may be performed in accordance with examples as disclosed herein. In some examples, aspects of the operations of 1415 may be performed by a CSI report generating component 730 as described with reference to FIG. 7.

At 1420, the method may include generating the second CSI report based on a demodulation reference signal measurement at the second antenna panel. The operations of 1420 may be performed in accordance with examples as disclosed herein. In some examples, aspects of the operations of 1420 may be performed by a CSI report generating component 730 as described with reference to FIG. 7.

At 1425, the method may include generating a third CSI report associated with both the first antenna panel and the second antenna panel based on combining a first channel impulse associated with the first antenna panel and a second channel impulse associated with the second antenna panel, or combining a first log-likelihood ratio associated with the first antenna panel and a second log-likelihood ratio associated with the second antenna panel. The operations of 1425 may be performed in accordance with examples as disclosed herein. In some examples, aspects of the operations of 1425 may be performed by a CSI report generating component 730 as described with reference to FIG. 7.

At 1430, the method may include transmitting, to the base station, an uplink control information message that includes at least one of the first CSI report, the second CSI report, and the third CSI report. The operations of 1430 may be performed in accordance with examples as disclosed herein. In some examples, aspects of the operations of 1430 may be performed by a UCI transmitter 735 as described with reference to FIG. 7.

Figure 15:
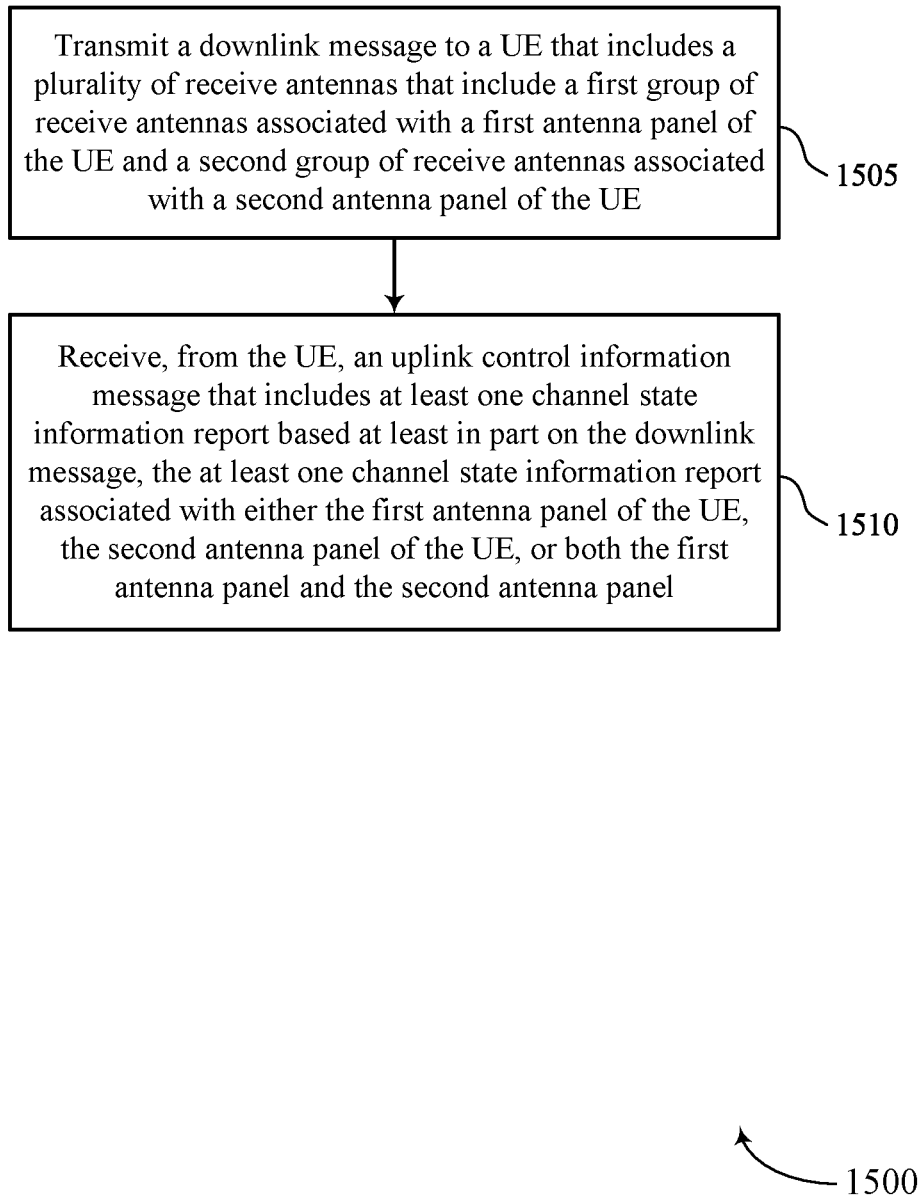

FIG. 15 shows a flowchart illustrating a method 1500 that supports CSI reporting for multiple panel UEs in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting a downlink message to a UE that includes a set of multiple receive antennas that include a first group of receive antennas associated with a first antenna panel of the UE and a second group of receive antennas associated with a second antenna panel of the UE. The operations of 1505 may be performed in accordance with examples as disclosed herein. In some examples, aspects of the operations of 1505 may be performed by a downlink message transmitter 1125 as described with reference to FIG. 11.

At 1510, the method may include receiving, from the UE, an uplink control information message that includes at least one CSI report based on the downlink message, the at least one CSI report associated with either the first antenna panel of the UE, the second antenna panel of the UE, or both the first antenna panel and the second antenna panel. The operations of 1510 may be performed in accordance with examples as disclosed herein. In some examples, aspects of the operations of 1510 may be performed by a UCI receiver 1130 as described with reference to FIG. 11.

Figure 16:
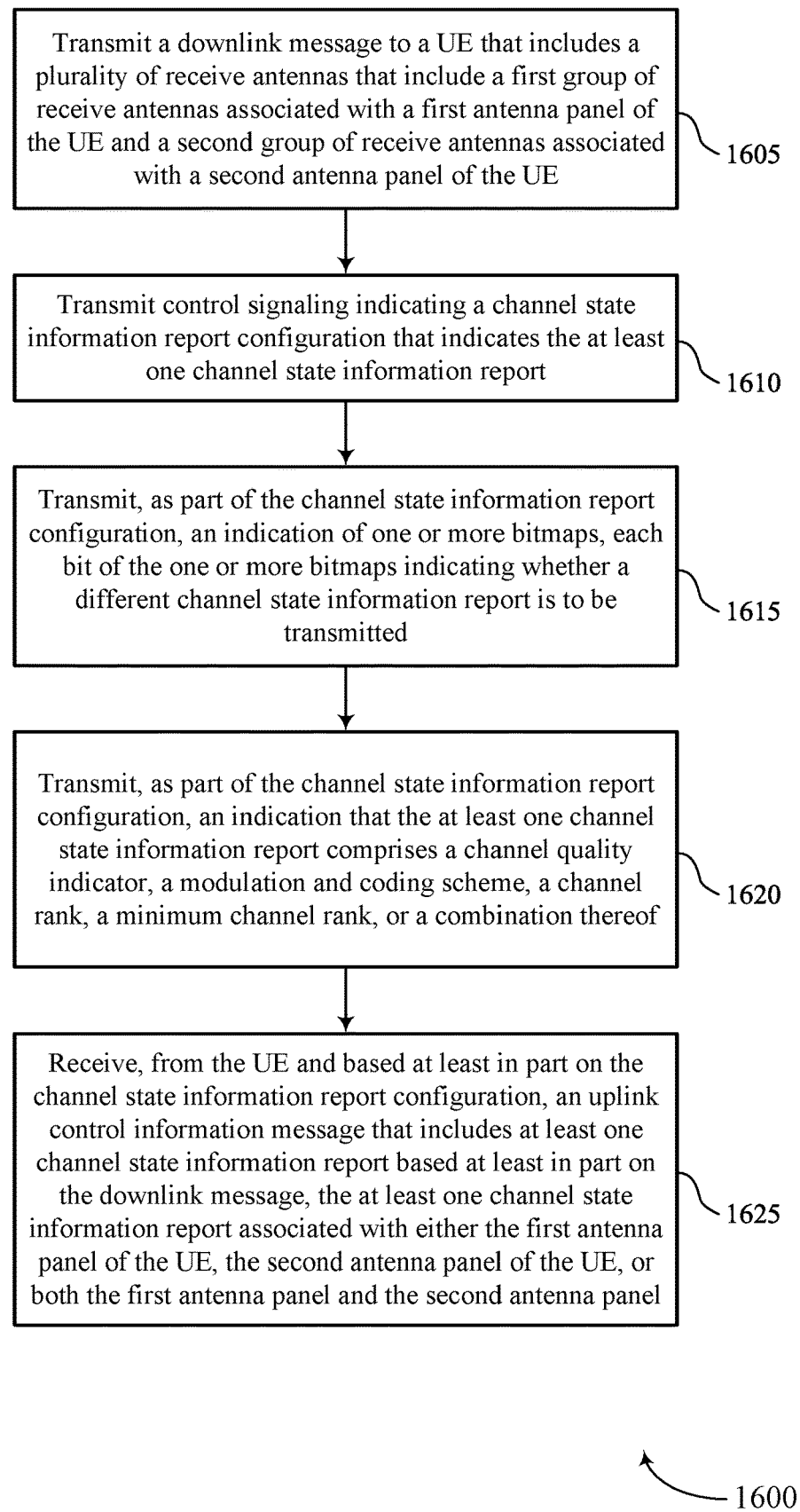

FIG. 16 shows a flowchart illustrating a method 1600 that supports CSI reporting for multiple panel UEs in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting a downlink message to a UE that includes a set of multiple receive antennas that include a first group of receive antennas associated with a first antenna panel of the UE and a second group of receive antennas associated with a second antenna panel of the UE. The operations of 1605 may be performed in accordance with examples as disclosed herein. In some examples, aspects of the operations of 1605 may be performed by a downlink message transmitter 1125 as described with reference to FIG. 11.

At 1610, the method may include transmitting control signaling indicating a CSI report configuration that indicates the at least one CSI report. The operations of 1610 may be performed in accordance with examples as disclosed herein. In some examples, aspects of the operations of 1610 may be performed by a CSI report configuration transmitter 1140 as described with reference to FIG. 11.

At 1615, the method may include transmitting, as part of the CSI report configuration, an indication of one or more bitmaps, each bit of the one or more bitmaps indicating whether a different CSI report is to be transmitted. The operations of 1615 may be performed in accordance with examples as disclosed herein. In some examples, aspects of the operations of 1615 may be performed by a CSI report configuration transmitter 1140 as described with reference to FIG. 11.

At 1620, the method may include transmitting, as part of the CSI report configuration, an indication that the at least one CSI report includes a channel quality indicator, a modulation and coding scheme, a channel rank, a minimum channel rank, or a combination thereof. The operations of 1620 may be performed in accordance with examples as disclosed herein. In some examples, aspects of the operations of 1620 may be performed by a CSI report configuration transmitter 1140 as described with reference to FIG. 11.

At 1625, the method may include receiving, from the UE and based at least in part on the CSI report configuration, an uplink control information message that includes at least one CSI report based on the downlink message, the at least one CSI report associated with either the first antenna panel of the UE, the second antenna panel of the UE, or both the first antenna panel and the second antenna panel. The operations of 1625 may be performed in accordance with examples as disclosed herein. In some examples, aspects of the operations of 1625 may be performed by a UCI receiver 1130 as described with reference to FIG. 11.

The following provides an overview of aspects of the present disclosure:

Aspect 1: A method for wireless communications at a UE, comprising: receiving, from a base station, a downlink message via a plurality of receive antennas of the UE, the plurality of receive antennas including a first group of receive antennas associated with a first antenna panel of the UE and a second group of receive antennas associated with a second antenna panel of the UE; generating a set of two or more CSI reports based at least in part on receiving the downlink message via the plurality of receive antennas, each of the set of two or more CSI reports associated with at least one of the first antenna panel or the second antenna panel; and transmitting, to the base station, an UCI message that includes at least one of the set of two or more CSI reports.

Aspect 2: The method of aspect 1, wherein generating the set of two or more CSI reports further comprises: generating at least a first CSI report associated with the first antenna panel and a second CSI report associated with the second antenna panel.

Aspect 3: The method of aspect 2, wherein generating at least the first CSI report and the second CSI report further comprises: generating the first CSI report based at least in part on a DMRS measurement at the first antenna panel; and generating the second CSI report based at least in part on a DMRS measurement at the second antenna panel.

Aspect 4: The method of any of aspects 2 through 3, wherein generating the set of two or more CSI reports further comprises: generating a third CSI report associated with both the first antenna panel and the second antenna panel based at least in part on combining a first channel impulse associated with the first antenna panel and a second channel impulse associated with the second antenna panel, or combining a first LLR associated with the first antenna panel and a second LLR associated with the second antenna panel.

Aspect 5: The method of any of aspects 1 through 4, further comprising: receiving control signaling indicating a CSI report configuration that indicates the at least one of the set of two or more CSI reports to be transmitted; and selecting the at least one of the set of two or more CSI reports based at least in part on the CSI report configuration.

Aspect 6: The method of aspect 5, wherein selecting the at least one of the set of two or more CSI reports further comprises: selecting the at least one of the set of two or more CSI reports based on one or more bitmaps indicated by the CSI report configuration, each bit of the one or more bitmaps indicating whether a different CSI report of the set of two or more CSI reports is to be transmitted.

Aspect 7: The method of aspect 6, further comprising: determining an acknowledgment level associated with receipt of the downlink message, each acknowledgment level based on either how close a successful decoding of the downlink message was to being an unsuccessful decoding, or how close an unsuccessful decoding of the downlink message was to being a successful decoding, wherein each bitmap of the one or more bitmaps corresponds to a different acknowledgement level.

Aspect 8: The method of aspect 7, wherein determining the acknowledgment level further comprises: measuring an SINR of the downlink message; mapping the SINR to a first MCS value; and selecting the acknowledgment level from a plurality of acknowledgment levels based at least in part on a difference between the first MCS value and a scheduled MCS value for the downlink message.

Aspect 9: The method of any of aspects 7 through 8, wherein determining the acknowledgment level further comprises: measuring a first SINR of the downlink message; identifying a scheduled MCS value for the downlink message; mapping the scheduled MCS value to a nominal SINR; and selecting the acknowledgment level from a plurality of acknowledgment levels based at least in part on a difference between the first SINR and the nominal SINR.

Aspect 10: The method of any of aspects 7 through 9, wherein transmitting the UCI message further comprises: transmitting, in the UCI message, an indication of the acknowledgement level associated with the downlink message.

Aspect 11: The method of any of aspects 5 through 10, wherein receiving the control signaling indicating the CSI report configuration further comprises: receiving an indication in the CSI report configuration that the at least one of the set of two or more CSI reports that is to be selected for transmission is based at least in part on whether individual ones of the set of two or more CSI reports are associated with a sounded panel of the first antenna panel or the second antenna panel, an unsounded panel of the first antenna panel or the second antenna panel, or a combination of the first antenna panel and the second antenna panel.

Aspect 12: The method of any of aspects 5 through 11, wherein receiving the control signaling indicating the CSI report configuration further comprises: receiving an indication in the CSI report configuration that the at least one of the set of two or more CSI reports that is to be selected for transmission comprises a channel quality indicator, an MCS, a channel rank, a minimum channel rank, or a combination thereof.

Aspect 13: The method of any of aspects 5 through 12, wherein receiving the control signaling indicating the CSI report configuration further comprises: receiving an indication in the CSI report configuration that the at least one of the set of two or more CSI reports that is to be selected for transmission is based at least in part on whether a negative acknowledgement is associated with reception of the downlink message.

Aspect 14: The method of any of aspects 1 through 13, further comprising: generating the UCI message as a two-stage UCI message, wherein a first stage of the two-stage UCI message includes acknowledgment or negative acknowledgment information pertaining to reception of the downlink message, and wherein a second stage of the two-stage UCI message includes the at least one of the set of two or more CSI reports.

Aspect 15: The method of aspect 14, wherein the second stage of the two-stage UCI message is formatted to include any one or more of a first CSI report, a second CSI report, or a third CSI report.

Aspect 16: The method of any of aspects 1 through 15, further comprising: determining a respective quantity of bits to carry CSI in each of the set of two or more CSI reports.

Aspect 17: The method of aspect 16, wherein each quantity of bits is based at least in part on a sounding status of the first antenna panel and the second antenna panel.

Aspect 18: The method of any of aspects 16 through 17, wherein each quantity of bits is based at least in part on whether the CSI carried in each report is to include a wideband MCS, a wideband RI, a wideband CQI, a subband MCS, a subband RI, a subband CQI, or combinations thereof.

Aspect 19: The method of any of aspects 16 through 18, wherein determining the respective quantity of bits further comprises: receiving an indication of each quantity of bits via RRC signaling.

Aspect 20: A method for wireless communications at a base station, comprising: transmitting a downlink message to a UE that includes a plurality of receive antennas that include a first group of receive antennas associated with a first antenna panel of the UE and a second group of receive antennas associated with a second antenna panel of the UE; and receiving, from the UE, an UCI message that includes at least one CSI report based at least in part on the downlink message, the at least one CSI report associated with either the first antenna panel of the UE, the second antenna panel of the UE, or both the first antenna panel and the second antenna panel.

Aspect 21: The method of aspect 20, wherein receiving the at least one CSI report further comprises: receiving at least a first CSI report associated with the first antenna panel of the UE and a second CSI report associated with the second antenna panel of the UE.

Aspect 22: The method of aspect 21, wherein receiving the at least one CSI report further comprises: receiving a third CSI report associated with both the first antenna panel of the UE and the second antenna panel of the UE.

Aspect 23: The method of any of aspects 20 through 22, further comprising: transmitting control signaling indicating a CSI report configuration that indicates the at least one CSI report; and receiving the at least one CSI report based at least in part on the CSI report configuration.

Aspect 24: The method of aspect 23, wherein transmitting control signaling indicating the CSI report configuration further comprises: transmitting, as part of the CSI report configuration, an indication of one or more bitmaps, each bit of the one or more bitmaps indicating whether a different CSI report is to be transmitted.

Aspect 25: The method of any of aspects 23 through 24, wherein transmitting control signaling indicating the CSI report configuration further comprises: transmitting, as part of the CSI report configuration, an indication that the at least one CSI report comprises a channel quality indicator, an MCS, a channel rank, a minimum channel rank, or a combination thereof.

Aspect 26: The method of any of aspects 20 through 25, further comprising: receiving the UCI message as a two-stage UCI message, wherein a first stage of the two-stage UCI message includes acknowledgment or negative acknowledgment information pertaining to reception of the downlink message, and wherein a second stage of the two-stage UCI message includes the at least one CSI report.

Aspect 27: The method of aspect 26, wherein the second stage of the two-stage UCI message is formatted to include any one or more of a first CSI report, a second CSI report, or a third CSI report.

Aspect 28: The method of any of aspects 20 through 27, further comprising: transmitting, via radio resource control signaling, an indication of a respective quantity of bits to carry CSI included in the at least one CSI report.

Aspect 29: An apparatus for wireless communications at a UE, comprising a processor; memory coupled with the processor; and instructions stored in the memory and executable by the processor to cause the apparatus to perform a method of any of aspects 1 through 19.

Aspect 30: An apparatus for wireless communications at a UE, comprising at least one means for performing a method of any of aspects 1 through 19.

Aspect 31: A non-transitory computer-readable medium storing code for wireless communications at a UE, the code comprising instructions executable by a processor to perform a method of any of aspects 1 through 19.

Aspect 32: An apparatus for wireless communications at a base station, comprising a processor; memory coupled with the processor; and instructions stored in the memory and executable by the processor to cause the apparatus to perform a method of any of aspects 20 through 28.

Aspect 33: An apparatus for wireless communications at a base station, comprising at least one means for performing a method of any of aspects 20 through 28.

Aspect 34: A non-transitory computer-readable medium storing code for wireless communications at a base station, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving, from a network entity, a downlink message via a plurality of receive antennas of the UE, the plurality of receive antennas including a first group of receive antennas associated with a first antenna panel of the UE and a second group of receive antennas associated with a second antenna panel of the UE;
generating a set of two or more channel state information (CSI) reports based at least in part on receiving the downlink message via the plurality of receive antennas, each of the set of two or more CSI reports associated with at least one of the first antenna panel or the second antenna panel, the set of two or more CSI reports including at least a first CSI report associated with the first antenna panel and a second CSI report associated with the second antenna panel;
receiving, from the network entity, control signaling indicating a CSI report configuration that indicates at least one of the first CSI report or the second CSI report to be transmitted; and
transmitting, to the network entity, an uplink control information message that includes the at least one of the first CSI report or the second CSI report based at least in part on the CSI report configuration.

2. The method of claim 1, wherein generating at least the first CSI report and the second CSI report further comprises:
generating the first CSI report based at least in part on a demodulation reference signal measurement at the first antenna panel; and
generating the second CSI report based at least in part on a demodulation reference signal measurement at the second antenna panel.

3. The method of claim 1, wherein generating the set of two or more CSI reports further comprises:
generating a third CSI report associated with both the first antenna panel and the second antenna panel based at least in part on combining a first channel impulse associated with the first antenna panel and a second channel impulse associated with the second antenna panel, or combining a first log-likelihood ratio associated with the first antenna panel and a second log-likelihood ratio associated with the second antenna panel.

4. The method of claim 1, further comprising:
selecting the at least one of the first CSI report or the second CSI report based at least in part on the CSI report configuration.

5. The method of claim 4, wherein the selecting of the at least one of the first CSI report or the second CSI report is based on one or more bitmaps indicated by the CSI report configuration, each bit of the one or more bitmaps indicating whether a different CSI report of the set of two or more CSI reports is to be transmitted.

6. The method of claim 5, further comprising:
determining an acknowledgment level associated with receipt of the downlink message, each acknowledgment level based on either how close a successful decoding of the downlink message was to being an unsuccessful decoding, or how close an unsuccessful decoding of the downlink message was to being a successful decoding, wherein each bitmap of the one or more bitmaps corresponds to a different acknowledgement level.

7. The method of claim 6, wherein determining the acknowledgment level further comprises:
measuring a signal-to-interference-plus-noise ratio of the downlink message;
mapping the signal-to-interference-plus-noise ratio to a first modulation and coding scheme value; and
selecting the acknowledgment level from a plurality of acknowledgment levels based at least in part on a difference between the first modulation and coding scheme value and a scheduled modulation and coding scheme value for the downlink message.

8. The method of claim 6, wherein determining the acknowledgment level further comprises:
measuring a first signal-to-interference-plus-noise ratio of the downlink message;
identifying a scheduled modulation and coding scheme value for the downlink message;
mapping the scheduled modulation and coding scheme value to a nominal signal-to-interference-plus-noise ratio; and
selecting the acknowledgment level from a plurality of acknowledgment levels based at least in part on a difference between the first signal-to-interference-plus-noise ratio and the nominal signal-to-interference-plus-noise ratio.

9. The method of claim 6, wherein transmitting the uplink control information message further comprises:
transmitting, in the uplink control information message, an indication of the acknowledgement level associated with the downlink message.

10. The method of claim 1, wherein receiving the control signaling indicating the CSI report configuration further comprises:
receiving an indication in the CSI report configuration that the at least one of the first CSI report or the second CSI report that is to be transmitted is based at least in part on whether individual ones of the set of two or more CSI reports are associated with a sounded panel of the first antenna panel or the second antenna panel, an unsounded panel of the first antenna panel or the second antenna panel, or a combination of the first antenna panel and the second antenna panel.

11. The method of claim 1, wherein receiving the control signaling indicating the CSI report configuration further comprises:
receiving an indication in the CSI report configuration that the at least one of the first CSI or the second CSI report that is to be transmitted comprises a channel quality indicator, a modulation and coding scheme, a channel rank, a minimum channel rank, or a combination thereof.

12. The method of claim 1, wherein receiving the control signaling indicating the CSI report configuration further comprises:
receiving an indication in the CSI report configuration that the at least one of the first CSI report or the second CSI report that is to be transmitted is based at least in part on whether a negative acknowledgement is associated with reception of the downlink message.

13. The method of claim 1, further comprising:
generating the uplink control information message as a two-stage uplink control information message, wherein a first stage of the two-stage uplink control information message includes acknowledgment or negative acknowledgment information pertaining to reception of the downlink message, and wherein a second stage of the two-stage uplink control information message includes the at least one of the set of two or more CSI reports.

14. The method of claim 13, wherein the second stage of the two-stage uplink control information message is formatted to include any one or more of a first CSI report, a second CSI report, or a third CSI report.

15. The method of claim 1, further comprising:
determining a respective quantity of bits to carry CSI in each of the set of two or more CSI reports.

16. The method of claim 15, wherein each quantity of bits is based at least in part on a sounding status of the first antenna panel and the second antenna panel.

17. The method of claim 15, wherein each quantity of bits is based at least in part on whether the CSI carried in each report is to include a wideband modulation and coding scheme (MCS), a wideband rank indicator (RI), a wideband channel quality indicator (CQI), a subband MCS, a subband RI, a subband CQI, or combinations thereof.

18. The method of claim 15, wherein determining the respective quantity of bits further comprises:
receiving an indication of each quantity of bits via radio resource control signaling.

19. A method for wireless communications at a network entity, comprising:
transmitting a downlink message to a user equipment (UE) that includes a plurality of receive antennas that include a first group of receive antennas associated with a first antenna panel of the UE and a second group of receive antennas associated with a second antenna panel of the UE;
transmitting, to the UE, control signaling indicating a channel state information (CSI) report configuration that indicates at least one of a first CSI report associated with the first antenna panel and a second CSI report associated with the second antenna panel to be transmitted; and
receiving, from the UE and based at least in part on the CSI report configuration, an uplink control information message that includes at least one CSI report based at least in part on the downlink message, the at least one CSI report associated with either the first antenna panel of the UE, the second antenna panel of the UE, or both the first antenna panel and the second antenna panel.

20. The method of claim 19, wherein receiving the at least one CSI report further comprises:
receiving the at least one of the first CSI report associated with the first antenna panel of the UE and the second CSI report associated with the second antenna panel of the UE.

21. The method of claim 20, wherein receiving the at least one CSI report further comprises:
receiving a third CSI report associated with both the first antenna panel of the UE and the second antenna panel of the UE.

22. The method of claim 19, wherein transmitting the control signaling indicating the CSI report configuration further comprises:
transmitting, as part of the CSI report configuration, an indication of one or more bitmaps, each bit of the one or more bitmaps indicating whether a different CSI report is to be transmitted.

23. The method of claim 19, wherein transmitting the control signaling indicating the CSI report configuration further comprises:

transmitting, as part of the CSI report configuration, an indication that the at least one of the first CSI report associated with the first antenna panel and the second CSI report associated with the second antenna panel comprises a channel quality indicator, a modulation and coding scheme, a channel rank, a minimum channel rank, or a combination thereof.

24. The method of claim 19, further comprising:
receiving the uplink control information message as a two-stage uplink control information message, wherein a first stage of the two-stage uplink control information message includes acknowledgment or negative acknowledgment information pertaining to reception of the downlink message, and wherein a second stage of the two-stage uplink control information message includes the at least one CSI report.

25. The method of claim 24, wherein the second stage of the two-stage uplink control information message is formatted to include any one or more of a first CSI report, a second CSI report, or a third CSI report.

26. The method of claim 19, further comprising:
transmitting, via radio resource control signaling, an indication of a respective quantity of bits to carry CSI included in the at least one CSI report.

27. An apparatus for wireless communications at a user equipment (UE), comprising:
a processor;
memory coupled with the processor; and
instructions stored in the memory and executable by the processor to cause the apparatus to:
receive, from a network entity, a downlink message via a plurality of receive antennas of the UE, the plurality of receive antennas including a first group of receive antennas associated with a first antenna panel of the UE and a second group of receive antennas associated with a second antenna panel of the UE;
generate a set of two or more channel state information (CSI) reports based at least in part on receiving the downlink message via the plurality of receive antennas, each of the set of two or more CSI reports associated with at least one of the first antenna panel or the second antenna panel, the set of two or more CSI reports including at least a first CSI report associated with the first antenna panel and a second CSI report associated with the second antenna panel;
receive, from the network entity, control signaling indicating a CSI report configuration that indicates at least one of the first CSI report associated with the first antenna panel and the second CSI report associated with the second antenna panel to be transmitted; and
transmit, to the network entity, an uplink control information message that includes at least one of the first CSI report associated with the first antenna panel and the second CSI report associated with the second antenna panel based at least in part on the CSI report configuration.

28. An apparatus for wireless communications at a network entity, comprising:
a processor;
memory coupled with the processor; and
instructions stored in the memory and executable by the processor to cause the apparatus to:
transmit a downlink message to a user equipment (UE) that includes a plurality of receive antennas that include a first group of receive antennas associated with a first antenna panel of the UE and a second group of receive antennas associated with a second antenna panel of the UE;

transmit, to the UE, control signaling indicating a channel state information (CSI) report configuration that indicates at least one of a first CSI report associated with the first antenna panel and a second CSI report associated with the second antenna panel to be transmitted; and receive, from the UE and based at least in part on the CSI report configuration, an uplink control information message that includes at least one channel state information (CSI) report based at least in part on the downlink message, the at least one CSI report associated with either the first antenna panel of the UE, the second antenna panel of the UE, or both the first antenna panel and the second antenna panel.

* * * * *